(12) United States Patent
Blatter et al.

(10) Patent No.: US 7,622,072 B2
(45) Date of Patent: *Nov. 24, 2009

(54) VERSATILE PROCESSES FOR PREPARING AND USING NOVEL COMPOSITE PARTICLES IN POWDER COATING COMPOSITIONS

(75) Inventors: Walter J. Blatter, Woodbury, MN (US); James A. Heck, Forest Lake, MN (US); Lowell G. Lindquist, Mahtomedi, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 474 days.

This patent is subject to a terminal disclaimer.

(21) Appl. No.: 11/331,247

(22) Filed: Jan. 12, 2006

(65) Prior Publication Data

US 2006/0120912 A1    Jun. 8, 2006

Related U.S. Application Data

(63) Continuation of application No. 10/206,482, filed on Jul. 26, 2002, now Pat. No. 7,105,201.

(51) Int. Cl.
*B22F 1/00* (2006.01)
*B05D 7/00* (2006.01)
(52) U.S. Cl. .............................. 419/6; 419/32; 427/213
(58) Field of Classification Search .................... 419/6; 427/213
See application file for complete search history.

(56) References Cited

U.S. PATENT DOCUMENTS

| | | | |
|---|---|---|---|
| 2,976,574 A | 3/1961 | Keutgen et al. | |
| 3,263,980 A | 8/1966 | Feder et al. | |
| 3,548,782 A | 12/1970 | Bergquist et al. | |
| 4,154,871 A | 5/1979 | White et al. | |
| 4,243,794 A | 1/1981 | White et al. | |
| 4,260,066 A | 4/1981 | Hannon et al. | |
| 5,319,001 A | 6/1994 | Morgan et al. | |
| 5,470,893 A | 11/1995 | Sinclair-Day et al. | |
| 5,585,426 A | 12/1996 | Williams et al. | |
| 5,856,378 A | 1/1999 | Ring et al. | |

(Continued)

FOREIGN PATENT DOCUMENTS

EP    0 250 183 A    12/1987

(Continued)

OTHER PUBLICATIONS

R. Pfeffer et al., "Synthesis Of Engineered Particulates With Tailored Properties Using Dry Particle Coating", Powder Technology, 117 (2001) 40-67.

(Continued)

*Primary Examiner*—Roy King
*Assistant Examiner*—Christopher Kessler
(74) *Attorney, Agent, or Firm*—Kagan Binder, PLLC

(57) ABSTRACT

Methodology for constructing composite particles from ingredients comprising two or more particulate components. The resultant particles are usefully incorporated into powder coating compositions. The approach also finds utility in other applications, including but not limited to the food, drug, and cosmetics industry. Fluidized particles are subjected to an intense, but relatively brief heating event. This causes associated particles to fusingly assemble into fused composite clusters.

27 Claims, 11 Drawing Sheets

U.S. PATENT DOCUMENTS

| | | | |
|---|---|---|---|
| 5,905,104 A | 5/1999 | Eklund et al. | |
| 5,919,530 A * | 7/1999 | Hurley et al. | 427/557 |
| 5,962,082 A | 10/1999 | Hendrickson et al. | |
| 6,197,369 B1 | 3/2001 | Watano et al. | |
| 7,105,201 B2 * | 9/2006 | Blatter et al. | 427/213 |

FOREIGN PATENT DOCUMENTS

| | | |
|---|---|---|
| EP | 0 372 958 A | 6/1990 |
| EP | 0 389 080 A | 9/1990 |
| GB | 2226824 A | 7/1990 |
| WO | WO 91/18951 | 12/1991 |
| WO | WO 98/08614 | 3/1998 |
| WO | WO 01/85360 | 11/2001 |

OTHER PUBLICATIONS

Hersey, "Ordered Mixing: A New Concept In Powder Mixing Practice", Powder Technology, 11 (1975) 41-44.

"Magnetically Assisted Impaction Coating Process To Synthesize Engineered Particulates With Controlled Surface Characteristics", Mat. Res. Soc. Symp. vol. 501, 1998, Materials Research Society.

* cited by examiner

VERSATILE PROCESSES FOR PREPARING AND USING NOVEL COMPOSITE PARTICLES IN POWDER COATING COMPOSITIONS

SPECIFIC REFERENCE TO EARLIER FILED APPLICATION

This patent application is a continuation of and is entitled to the benefit of the filing date of prior patent application Ser. No. 10/206,482, now U.S. Pat. No. 7,105,201, filed on Jul. 26, 2002, by Blatter et al. and titled VERSATILE PROCESSES FOR PREPARING AND USING NOVEL COMPOSITE PARTICLES IN POWDER COATING COMPOSITIONS, wherein the entirety of said prior patent Application is incorporated herein by reference.

FIELD OF THE INVENTION

The present invention relates to powder coating compositions. More specifically, the present invention relates to powder coating compositions that incorporate composite powders constructed from a plurality of distinct particulate components.

BACKGROUND OF THE INVENTION

Powder coating compositions generally incorporate one or more film-forming ingredients and optionally one or more additional ingredients that enhance the manufacturability, use, and/or performance of the composition. Examples of such additional ingredients include colorants, fillers, slip additives, UV stabilizers, antioxidants, fluidizing agents, flow control agents, agents that modify surface tension, degassing agents, flexibilizing agents, coalescing agents, texturizing agents, antistatic agents, gloss modifying agents, luster agents (such as metal flakes), fungicides, bactericides, strengthening agents, toughening agents, biological agents, combinations of these, and the like.

Conventional processes for making powder coating compositions involve intimately mixing the ingredients, e.g., in an extruder, after which the extrudate is comminuted (e.g., ground or otherwise micronized) to obtain a powder of the desired particle size. This process involves intimate mixing of all the ingredients, and the composition of the resultant particles is generally homogeneous. Several other routes that are described in the patent literature are alleged to duplicate the results from a melt mixing process such as an extrusion process.

Making homogeneous particles is not always desirable. If the content of some additives is too high, the surface flow characteristics of the resultant powder can be degraded. For some ingredients, intimate mixing may not be practical from a manufacturing perspective. For instance, some formulations may be susceptible to segregation, leading to inconsistent performance. Mutually reactive ingredients may have a tendency to prematurely react under the temperatures and operating conditions typically involved during extrusion. Some ingredients are easily damaged, and thus not as compatible with extrusion processing as may be desired. Metal flakes, for example, can be badly crumpled during extrusion and/or grinding, causing the flakes to lose their luster.

The industry is already aware of these drawbacks. Consequently, mixtures of different particles have been used in some instances where use of a single particle is not practical. See, e.g., U.S. Pat. No. 4,260,066; EP 0 250 183 A; EP 0 372 958 A; and EP 0 389 080 A. Unfortunately, merely mixing particles has serious drawbacks. Simple dry blends may experience compositional shifts due to segregation that may occur during storage, transport, and/or use. Dry blends may also experience compositional shifts as they are reclaimed. Reclaim performance is important, because powder coating applications rarely if ever transfer 100% of the material to a substrate. Typical efficiencies are in the 60% to 70% range (although this is heavily dependent on the application and the substrate being used). To avoid the loss of a substantial portion of the powder, it is critical that material can be reclaimed. To assure that reclaimed material performs the same as the original material, the material must be compositionally stable over time.

To avoid the drawbacks of merely blending different particles, the industry has attempted to create fused agglomerates of different particles. With respect to color mixing, the GB 2226824 A patent application publication describes a powder coating composition of composite particles in which differently-colored particles are bonded together into composite clusters having a raspberry-like structure. This "raspberry" approach to forming agglomerates of particles also has been described in the powder coating literature to some degree in connection with metal additives. U.S. Pat. Nos. 5,856,378, 5,470,893 and 5,319,001 describe a similar approach. However, the methodology for making these agglomerates as described in these patents does not appear to be commercially viable. It is difficult to avoid equipment fouling and to control the particle size with this approach.

Consequently, although the concept of constructing composite particles from different particle components is appealing, a practical, effective way of doing this in a manner that has achieved widespread commercial acceptance has eluded the industry. Thus, there still remains a strong demand for some technical solution for how to effectively incorporate ingredients into compositionally stable powder coating compositions when all or some of the ingredients are not readily co-processable.

There has also been a strong demand for powder coating compositions that can be used to form coatings on temperature sensitive substrates such as plastics, wood, fabricated panels (e.g., particle board, medium density fibreboard, chipboard, plywood, paperboard, and the like), combinations of these, and the like. Application of powder coatings to temperature sensitive substrates such as these requires fundamental changes in the powder properties. Thermosetting materials generally undergo chemical curing reactions that are induced by heating, irradiation, and/or the like. The film-forming constituents typically are molten under the cure conditions to facilitate formation of uniform coatings. Since many of the substrates are heat sensitive, the ideal product would melt and cure at lower temperatures in comparison to conventional coatings applied to more heat-resistant substrates such as metal. This requires the use of catalysts, initiators, curatives, and/or reactants that would react under normal powder manufacturing processes (melt mixing in a single or twin-screw extruder) resulting in poor flow, gel formation, and inconsistent coating properties. In short, low temperature curing agents and systems are known, but these are difficult to compound into powder coating compositions inasmuch as the materials tend to react prematurely under the temperature conditions typically encountered when the powders are manufactured.

The research and development of commercially viable powder coating compositions that melt and cure at low temperatures thus has been extremely challenging. Some significant advances have been made, yet there is substantial room for more advancement. This is evidenced by the fact only a few low temperature powder coating compositions are in limited, commercial use in connection with coating temperature sensitive substrates. Research and development has been hampered in that traditional powder process technology is limiting in terms of formulation flexibility and process conditions.

So-called rapid cure powder coating systems have been suggested as one approach for coating substrates. Rapid-cure systems are of interest both for systems that are intended to be cured at higher temperatures (e.g., 300° F. or higher) as well as systems to be used at lower temperatures (e.g., below 300° F.). Systems that cure via irradiation (e.g., e-beam energy, ultraviolet energy, or the like) constitute illustrative examples of systems that cure rapidly, but thermally-induced rapid-cure systems also are known. However, rapid-cure systems are susceptible to chemical advancement, e.g., premature curing, not just during manufacture, but also during storage, handling, or use. Many rapid cure systems require refrigerated storage or have limited shelf life. It would be advantageous if the product could be shipped and stored under normal ambient conditions without risking chemical advancement. There is a need to find a way to impart adequate chemical stability to these systems so that they could be used more widely and more easily.

In addition, to obtain smooth coatings under low temperature and/or rapid cure conditions, it would be advantageous to use viscosity modifiers to obtain the desired flow characteristics. Many of the best flow modifiers, however, are crystalline in nature. These crystalline materials can be either reactive or non-reactive. Unfortunately, they are not as compatible and/or co-processable with other powder coating ingredients as might be desired. Melt mixing crystalline materials having low melt temperatures (i.e., melt temperatures below the Tg, i.e., the glass transition temperature, of the film forming resin(s), process temperature, and/or use temperature) with other powder coating ingredients often causes the mix to lose shear, causing the resulting product to be poorly dispersed. Further, to the extent that such materials might be co-processable, the amount that may be practically used is limited by compatibility issues. Ideally a production process could be uncovered that would allow inclusion of these crystalline raw materials in powder coating compositions at any desired level.

Crystalline raw materials with high melt points (e.g., those having melt points higher than the Tg of the film-forming resin(s), process temperature, and/or use temperature) can cause another type of problem in low temperature curing powder coatings. For instance, if a crystalline material has a melt temperature higher than the process temperature, it will not melt in the extruder. The extruder must then function as a grinder to break and distribute the material in the melt, which is not always desirable. This type of raw material is conventionally incorporated into a powder coating by using longer retention times in the extruder and/or using a more aggressive screw design. Since both changes cause higher process temperatures, they would not be acceptable for a powder designed to flow and cure at low temperatures. In addition, most of the base resins would be designed to be low in viscosity, greatly reducing the shear force available to break up chunks of crystalline material. Thus the resulting powder coating would not have a controlled domain size for the crystalline material, which would result in inconsistency in the final properties (both appearance and physical).

As another drawback, the addition of crystalline materials often leads to too low a Tg for the uncured powder. Liquid raw materials have a similar effect. For both cases, the low product Tg makes the product difficult to process in a traditional powder process since the blend does not solidify quickly on a chilled belt. Likewise, the product may not have returned to a glassy state on reaching the chipping or the grinding processes. Even if cryogenic conditions were used to overcome these in-process problems, the low product Tg would cause sintering and poor physical stability for the powder once it is placed in storage. Although small amounts of crystalline material can be incorporated without dropping the Tg below the industry standards (no sintering at 40° C. for 1 week), it would be much more desirable if a way could be found to use crystalline materials at much higher levels given the potential benefits if only the drawbacks could be reduced or avoided. Once again, it would be an advantage to have a process that can incorporate high levels of crystalline raw materials to meet the high flow and rapid cure requirements while still allowing shipment and storage under ambient conditions.

Many substrates of potential interest to the powder coating industry, e.g., wood, plywood, particle board, medium density fibreboard, and the like, often are only moderately conductive. Moisture is believed to be an important source of conductivity in such materials. Thus, regions that tend to dry out (sharp edges, corners, routed areas) are even less conductive. Consequently, it is difficult to consistently powder coat these substrates. Even if some areas are well covered, corners, routed areas and sharp edges remain a problem. Since powder charging is related to particle size distribution, it is critical that the particle size distribution ("PSD") is tightly controlled. However, current grinding technology gives only limited control of the PSD. Additional control can be obtained by classification, but this raises issues of yield loss and the high probability that re-extruding fine particles, e.g., those having a particle size of less than about 10 μm, will lead to unacceptable chemical advancement for rapid cure formulations. To optimize the powder coating product, there is a need to obtain a controlled particle size distribution without feeding the fines back into the extrusion process.

For the same reasons it would also be an advantage to design a process that would allow the attachment of small amounts of materials designed to enhance or control charging effects.

SUMMARY OF THE INVENTION

The present invention provides unique and innovative approaches for assembling composite particles from ingredients comprising two or more particulate components. The resultant particles are usefully incorporated into powder coating compositions with or without any other additional constituents. The approach also finds utility in other applications, including but not limited to foods, drugs, cosmetics, fertilizers, and the like.

The technology provides versatile methods for heterogeneously incorporating a wide variety of different particulate ingredients into a powder coating composition that might not be as easily co-processed using conventional practices. The technology has wide utility and is especially useful for making heterogeneous engineered particles from ingredient(s) which may be too temperature sensitive for conventional extrusion processing. The technology also may be used to incorporate otherwise incompatible materials into the same powder composition. For example, some ingredients, e.g., crystalline materials, may not be compatible with other materials in the composition. Additionally, some combinations of ingredients, when intimately mixed, may also pose stability challenges in terms of product handling, composition, storage, or the like. Higher levels of some materials may also be used than is practically feasible using conventional practices, leading to dramatic performance improvements. For instance, improved curing performance, (e.g., better curing at low temperature, faster curing, more uniform curing, and/or the like) may be achieved by using unconventionally higher levels of catalyst, initiator, and/or curing agents.

The assembled structures are stable and durable. The materials have excellent storage and transport stability and may be reclaimed and reused many, many times without any significant shift in composition.

The particle size distribution of the resultant composite particles is easily and highly controllable. This is particularly desirable when powder coating moderately conductive substrates. These characteristics are also helpful for forming high quality, thin film coatings.

The present invention is significant in that it enhances the pace at which research avenues can be explored via enhanced formulation and process flexibility.

Because the present process may utilize conditions that are much more compatible with various ingredients from a physical standpoint and a temperature standpoint than traditional processes, the inventive process need not damage the physical structure of the particles. This provides significant benefit in the ability to select materials, e.g., metal flakes, for incorporation into particles that otherwise would not survive the traditional particle making processes.

Materials having relatively low glass transition temperatures (and/or melting point, as the case may be) may be combined with materials having relatively high glass transition temperatures (and/or melting point, as the case may be). Thus, high levels of crystalline raw materials may be provided with other materials to improve flow and smoothness at low cure temperatures. Similarly, non-sintering raw materials may be used to coat and stabilize low glass transition materials that would otherwise not satisfy normal industry storage conditions.

Further, using the processes of the present invention one can more readily control the surface chemistry of particles in the powder coating composition. This enables enhancing or controlling charging effects or other surface phenomena of the particles.

The present process also provides significant engineering benefits from an efficiency and environmental standpoint. The present process is easily provided as a continuous process for manufacture of particles. The process further need not use solvent, and so may be provided in one embodiment as a more environmentally friendly process as compared to a process that uses solvent. Because no solvents need be involved in a preferred embodiment of the present process, this embodiment raises no concern for solubility of the individual particles in designing a reaction system.

Preferred embodiments of the present invention do not incorporate adherents such as adhesives, waxes, etc that would otherwise adversely affect the final properties of the ultimate coating made from the powder coat composition to maintain association of the particulate components of the composite particles.

As yet another advantage of the present process, fines resulting from conventional processing are readily incorporated into the composite particles and therefore are dramatically reduced in number. The lack of fine dust in the powder coating particles of the present invention is a safety and convenience benefit to the user when applying the powder.

By virtue of their unique, uniform particle size distribution, preferred embodiments of heterogeneous particles according to the present invention tend to flow substantially easier than prior art particles. This provides substantial benefit both in pourability and in the ability to fluidize the particle composition better in a spray gun, fluidized bed, or the like during coating operations.

Particles according to the present invention advantageously show low compressibility characteristics. Low compressibility is important relative to product storage and transport. After being packaged, materials that are more compressible will decrease in volume much more than materials that are less compressible. For samples that are very compressible, a box that was completely filled at manufacture could arrive at a customer appearing to be only half full, leading the customer to believe that that they were shorted. Too much compressibility also underutilizes the packaging, leading to waste in packaging costs.

It has also been observed that embodiments of the invention comprising rounded material are easier to convey through electrostatic spray equipment. The materials also show less tendency to sinter inside equipment, even at higher pressures.

In one aspect, the present invention relates to a process for preparing particles for a powder coating composition. A first particle component comprising a plurality of first particles is provided. A second particle component comprising a plurality of second particles is also provided. At least one of the first and second plurality of particles comprises a film-forming resin having a glass transition temperature (Tg). The first and second particle components are mixed to form a particle mixture. The particle mixture is fluidized. The fluidized particle mixture is subjected to a heating event under conditions effective to provide a plurality of composite particles.

In another aspect, the present invention relates to the resultant composite particles.

In another aspect, the present invention relates to a process for preparing particles for a powder coating composition. A plurality of first particles is provided. A second plurality of particles is also provided. The first particles and said second particles are mixed to form a particle mixture. The particle mixture is fluidized in flow comprising a gas. The fluidized particle mixture is caused to flow through a heating zone of a treatment vessel. A heat source independent of the flow of the fluidizing gas is provided that contributes heat energy to the heating zone.

In another aspect, the present invention relates to a powder coating composition comprising composite particles. The composite particles comprise a crystalline ingredient. The powder coating composition is coatable and curable at a temperature below about 300° F. In another aspect, the present invention relates to a method of making such a powder coating composition that incorporates such composite particles. The composite particles optionally may be mixed with one or more additional ingredients to form a powder coating composition suitable for application to a substrate.

In another aspect, the present invention relates to a method of coating a substrate. A powder coating composition according to any aspect herein coated onto a substrate under conditions effective to form a coating having a thickness of less than about 1.5 mils, preferably less than about 1 mil. In the industry, these coatings are classed as thin films. It is a distinct advantage that the present invention can be used to make true thin films via powder coating techniques.

BRIEF DESCRIPTION OF THE DRAWINGS

The above-mentioned and other advantages of the present invention, and the manner of attaining them, will become more apparent and the invention itself will be better understood by reference to the following description of the embodiments of the invention taken in conjunction with the accompanying drawings, wherein.

DETAILED DESCRIPTION

Figure 1A:
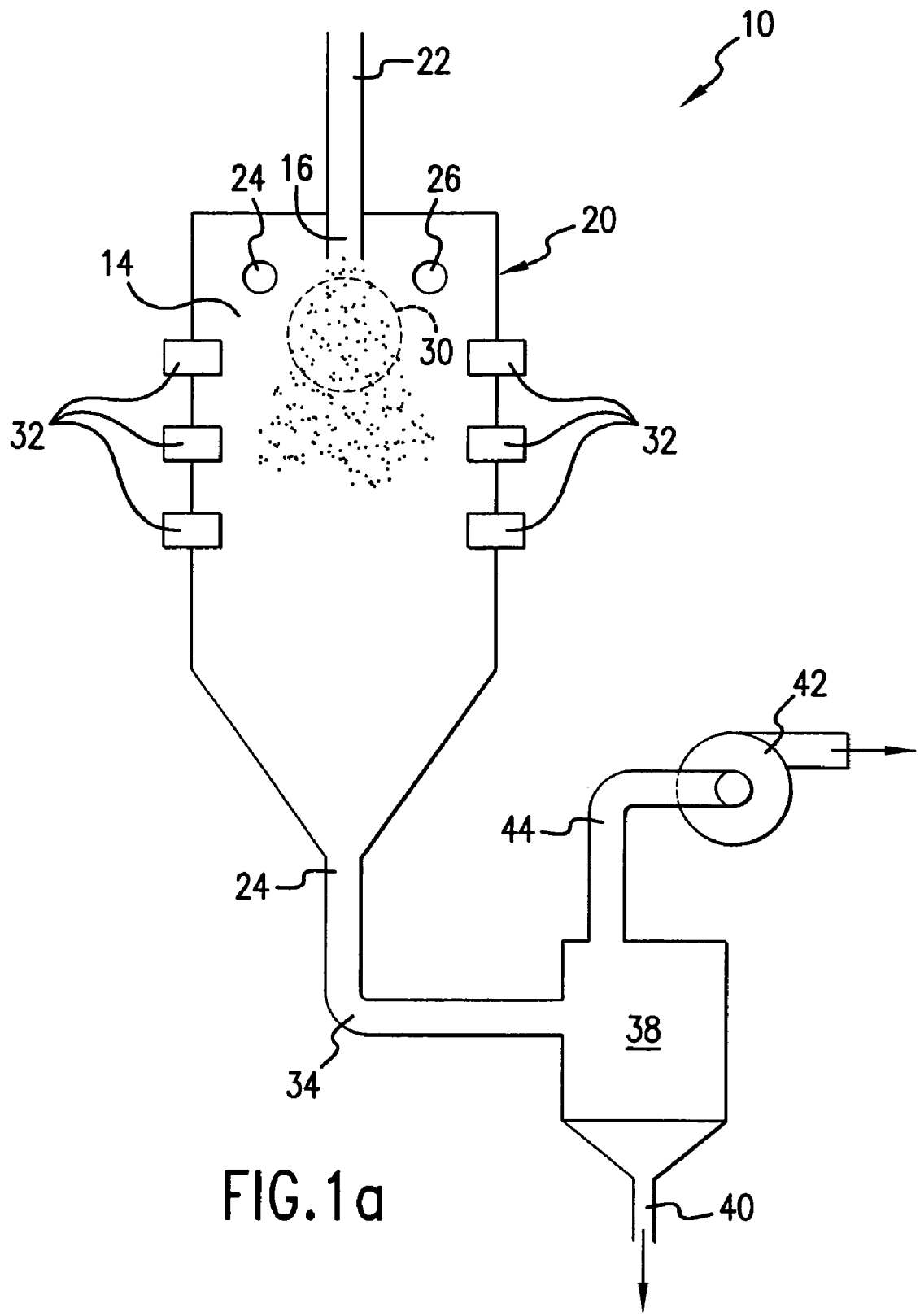
FIG. 1a is a schematic side view in partial section of an apparatus for generating heterogeneous particles according to the present invention.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention. It will be appreciated that specific features as described in the context of specific embodiments of the processes described herein provide substantial benefit in the resultant composite particles, powder coating compositions, methods for making powder coating compositions, and methods of coating substrates with powder coating compositions as described herein One preferred mode of practicing the present invention involves a methodology having multiple aspects, including (1) mixing ingredients comprising two or more particulate components to form a particulate mixture comprising particle clusters formed by associated particle components; (2) fluidizing, suspending, aspirating, and/or entraining the particulate mixture such as in a gas, via vibration, using electrostatic charge and/or the like; (3) while the mixture is fluidized, suspended, aspirated, and/or entrained, subjecting the particulate mixture to a heating event of sufficient intensity and controlled duration so as to more permanently fix the components of the particulate clusters to form composite particles without undue, additional agglomeration and without causing undesired temperature effects. The resultant composite particles are stable compositionally and advantageously possess the combined functionality of individual components. In some embodiments, some or all of the particulate components may retain their identities as they fusibly bond with other components. In other embodiments, some or all of the organic components fully melt and diffuse, blend, coat, coalesce, and/or the like, with other components to some degree.

The practice of the present invention is especially useful for constructing composite particles from multiple ingredients that are not so easily co-processed together due to factors such as compatibility issues, temperature sensitivity, susceptibility to damage during conventional processing, and the like. Thus, for instance, low temperature catalysts (i.e., catalyst materials that catalytically function at lower temperatures, e.g., below about 300° F.), initiators, and/or curing agents may be initially excluded from a formulation as the formulation is fabricated into particles using a suitable technique that may involve high temperature, such as extrusion processing. In the meantime, the temperature sensitive ingredient(s) may be formulated into separate particles to avoid chemical advancement. Thereafter, the different particles may be easily assembled into composite particles using the methodology of the present invention.

In the first, mixing step, the desired ingredients comprising at least two different particulate components are mixed together to form a particulate mixture. One or more liquid ingredients may also be used, although it is preferred that the ingredients used to form the particulate mixture are substantially solvent-free. As used herein, "substantially solvent-free" means that less than about 5 weight percent, preferably less than about 1 weight percent, and more preferably less than about 0.5 weight percent of the ingredients incorporated into the particulate mixture may constitute a solvent.

Preferably, the mixing occurs under conditions such that the particulate components associate into individual particulate clusters and such that undue degradation of physical and/or chemical characteristics of the individual particle components is avoided. An association among particles generally means that at least a portion of the particles remain attached to each other as much as is practical, at least during the manipulation activities of the manufacturing process. Preferably, an association among the particles means that at least a portion of the particles are attached to each other at least via physical means. Depending upon the mixing technique(s) used, the nature of the components, and the like, such associations may arise due to one or more forces such as triboelectric forces, Van der Waals forces, liquid bridges, capillary forces, mechanical interlocking due to impact, and/or the like. By controlling the particle sizes of the various particulate components and the manner in which they are combined, the components can be assembled into surprisingly uniform population of particle clusters with minimal aggregation of the clusters themselves. The resultant clusters may be uniform in terms of both their particle sizes and constituents.

As one example, electrostatic mixing techniques may be used to form particle clusters from one or more positively charged particles and one or more negatively charged particles. Electrostatic mixing practices are well known and any such conventional practices as such may be constituted from time to time, may be used.

When using electrostatic mixing techniques, the positively and negatively charged particles independently may have particle size characteristics selected within a wide range. Preferably, particle sizes are selected so that the resultant clusters will be characterized by a particle size distribution that is suitable for powder coating applications without the need to further subject the final composite particles to comminuting or agglomerating treatments, as the case may be. In some instances, sieving may be used to enhance the particle size uniformity of the product.

Particle size may be measured in any appropriate manner. Preferably, particle size measurements are made using a laser light diffraction particle size analyzer (such as a Malvern Mastersizer X) using a dry powder feeder module. The measurement from this technique reports a particle size distribution curve, expressed in terms of the volume of equivalent spheres. The numbers reported are diameters of spheres having a volume equivalent to the calculated volume of the particles being measured. The $d_{10}$, $d_{50}$, and $d_{90}$ values that are reported from the distribution curve indicates the maximum particle size, in the case for example of $d_{10}$, where 10% of the area of the distribution curve is equal to or smaller than that value. Values for $d_{50}$ and $d_{90}$ are determined in an analogous manner for 50% and 90%, respectively. Throughout this specification, a reference to particle size refers to the volume $d_{50}$ (median particle size) unless otherwise expressly noted.

As preferred general guidelines, either the positively or negatively charged particles may have a median particle size ($d_{50}$) in the range from about 5 micrometers to about 100 micrometers, more preferably about 15 micrometers to about 60 micrometers. More preferably, each particulate component has a particle size that is distinct from one or more of the other particulate components, as this makes it easier to construct a more homogeneous population of particle clusters in terms of particle size and overall formulation, even though the composition of the individual particle clusters may be heterogeneous. Resultant composite particles may have an average particle size in the range from about 3 µm to about 500 µm.

As an alternative to electrostatic mixing, mechanical mixing techniques may also be used to create a particulate mixture in which particulate components are associated into desired particulate clusters. Mechanical mixing is especially useful for creating ordered mixtures, although electrostatic mixing may also be used for this purpose as well.

An ordered mixture generally is a mixture in which one or more relatively small guest particles are associated onto the surfaces of one or more relatively large core particles. Typically, one or more kinds of guest particles independently may have a median particle size of less than about 10 micrometers. The one or more kinds of core particles typically independently may have a median particle size in the range of about 15 micrometers to about 50 micrometers, although larger core particles may be used in some applications. Within such ranges, it is also desirable that the relative sizes of the host and guest particles are suitable for forming an ordered mixture. Thus, it is preferred that the ratio of the volume average particle size of the host particles to the guest particles is greater than about 3:1, more preferably greater than about 10:1, and more preferably greater than about 20:1. Optionally, one or more liquid ingredients may be included in the ingredients used to make an ordered mixture.

For a general discussion of the science of ordered mixtures, please refer to Pfeffer et al., "Synthesis of engineered Particulates with Tailored Properties Using Dry Particle Coating", Powder Technology 117 (2001) 40-67; and Hersey, "Ordered Mixing: A New Concept in Powder Mixing Practice", Powder Technology, 11 (1975) 41-44.

The preferred aspect of forming an associated particle cluster that is an ordered mixture from particulate components is especially advantageous. Firstly, an extremely uniform population of particle clusters results. Generally, the same kind and amounts of guest particles generally coat the same kinds of host particles to a similar degree. In practical effect, by taking advantage of the principles of creating ordered mixtures, particle components "self-assemble" into particle clusters that are substantially similar both structurally and compositionally.

As still yet another advantage, varying the particle size of the guest particles allows characteristics of the resultant powder coating composition to be easily controlled. This is beneficial inasmuch as many conventional methodologies rely primarily upon formulation strategies, not particle size, to control similar characteristics. For example, in the practice of the present invention, varying the particle size of the guest particle allows the gloss of the resultant coatings to be readily and consistently controlled. Specifically, using a larger sized guest particle tends to reduce gloss when the guests comprise at least one gloss-reducing constituent.

A wide variety of commercially available equipment may be used to prepare the particulate mixtures. Examples of suitable mixing devices include high speed batch mixers (such as mixing equipment commercially available as Mixaco from Mixaco Maschinenbau, or Welex from Gunther Papermeier, or the hybridizer from Nara Machinery, or the Mechanofusion unit available from HMPS (Hosokawa Micron Particle Systems; continuous high shear mixers (such as the Turbilizer from Hosokawa Bepex,); the RFBC (Rotating Fluidized Bed Coating) as described in "Synthesis of Engineered Particulates Using Dry Particle Coating, Powder Technology 117 (2001) pg 40-67 or U.S. Pat. No. 6,197,369; the MAIC (Magnetically Assisted Impact Coating device as described in the article "Magnetically Assisted Impaction Coating Process to Synthesize Engineered Particulates with Controlled Surface Characteristics," Mat. Res. Soc. Symp. Proc. Vol 501, 1998 Materials Research Society.), motionless or static mixers, electrostatic mixing methods, fluidized beds, mixing jets, combinations of these (such as disclosed in U.S. Pat. No. 6,197,369); combinations of these, and the like.

Preferably, undue heating during the stage of forming the particulate mixture is avoided. If the particulate components are subjected to too much heat at this stage, in terms of intensity and/or duration, the particulate components may soften and/or melt more than is desired. This can lead to undesirably high levels of particle agglomeration as well as fouling of equipment due to undesirable build-up of material on equipment walls, passageways, and the like. At this stage, one indicator that cluster formation is occurring with too much energy is the formation of fused and/or bonded agglomerates that need to be comminuted before being suitable for use in powder coating compositions. Accordingly, it is highly preferred that the pre-mixing step occur under conditions such that the temperature of the components stays below the glass transition temperature or melting temperature, as the case may be, of any particulate components that contain resin binder or other ingredients that can cause softened or melted particles to bond to one another. This helps to ensure that as many of the associations of the particles at this stage are physical associations as is practical. A mixing apparatus may be actively cooled to achieve this purpose.

The relative amounts of the various particulate components used to form the particulate mixture are not critical and will depend upon factors including the ingredients being used, processing conditions, use conditions, and the like. There is really no firm upper or lower limit so long as enough of each ingredient is included so as to achieve the desired functionality associated with such ingredient. As an example, in the context of an ordered mixture, the weight ratio of host particles to guest particles may vary over a wide range, although it is preferred in many instances that using an excess of guest particles above the surface capacity of the host particles is desirably avoided. Depending upon the kind of guest particle being used, it is preferred in some embodiments to completely encapsulate host particles with guest particles. In other embodiments, it may be preferred to use enough guest particles relative to the host particles so that 0.01 to about 95%, preferably 0.05 to about 50% of the surface areas of the host particles to be covered by the guest particles.

The preferred particle clusters resulting from the pre-mixing step will tend to be associated via one or more physical forces. The forces may or may not be sufficiently strong such that the structure of the particle clusters is stable throughout further handling, storage, spraying onto substrates to form coatings, and/or reclaiming one or more times. Accordingly, it is highly desirable to make the associations among particle components in the particle clusters more permanent. Conventional methodologies have attempted to achieve this in the past using heat in order to fuse particles together. However, it previously has been difficult to heat mixtures of particles in such a way that particles within a cluster are fused to, blended with, coalesced with, coated onto, or otherwise incorporated with each other while bonding among different clusters is minimized. It has also been difficult in the past to apply the requisite heat under conditions that are as effective as might be desired for commercial applications.

The present invention is significant, because it provides a way to construct composite, heterogeneous particles from multiple particulate components using heating effects. Fusion, blending, coating, coalescence, diffusion, or the like within particle clusters is easily achieved while fusion, blending, coating, coalescence, diffusion, or the like among different particle clusters, and the associated undesirable agglomeration is minimized. This is accomplished in two stages, which may occur sequentially, simultaneously, and/or in overlapping fashion as desired. First, the particulate mixture is caused to be in a low density condition. Preferably, the low density condition is established by fluidizing, aspirating, suspending or entraining the particles clusters in a gas (collectively "fluidizing"). Such fluidizing may be achieved using vibration energy, electrostatic energy, a moving gas, combinations of these, and the like.

Second, while the mixture is fluidized, the mixture is subjected to a heating event of sufficient intensity and controlled duration to achieve more permanent fixation of components. Because the particles are in a low density condition (due to fluidization) during the heating event, interparticle collisions and contact are minimized during heating so as to advantageously avoid undesirable agglomeration. Because the heating event is of controlled duration, chemical advancement and/or temperature degradation are minimized as well. In practical effect, the approach of the invention subjects the particle clusters to an intense but relatively brief heating event in which the individual particle clusters tend to experience the heating event in isolation from other particle clusters. In one perspective, the inventive methodology may be viewed as providing a method in which the particle clusters are heated en masse and yet individually at the same time.

Preferably, negligible or substantially no additional agglomeration of the associated particles occurs throughout the heating event. Negligible particle agglomeration is defined by less than about a 20 percent, more preferably less than about a 10 percent, and more preferably less than about a 5 percent increase in the median particle size distribution $d_{50}$ and/or $d_{90}$ values from the associated particles to the heterogeneous particles.

Preferably, the heat source used to initiate the heating event is at least partially independently controllable with respect to the energy source or media used to accomplish fluidization. This allows the heating event to be initiated and stopped with greater control while the particle clusters are in the low density condition.

A preferred mode of fluidizing the particles involves fluidizing the particles in a suitable carrier gas. The carrier gas may comprise one or more gases that may be inert (e.g., nitrogen, carbon dioxide, argon, or the like), air, and/or any other suitable gas or combination of gases. In some embodiments, the carrier gas may include one or more reactive species. For instance, an oxidizing and/or reducing species, as desired, may be incorporated into the carrier gas if it is desired to oxidize or reduce, as the case may be, an ingredient of the particulate mixture. The carrier gas may be at any desired temperature, provided that the carrier gas is at a temperature that is low enough to avoid softening and/or melting any constituent of the particles that can cause undue bonding or agglomeration to occur when melted or softened. In such embodiments, the temperature of the carrier gas is thus below the temperature at which the heating event takes place. This allows the heating event to be initiated and stopped with good control while the particle mixture is in a fluidized state.

While the particle mixture is in a fluidized state, the mixture is then subjected to at least one heating event at a temperature that is greater than the temperature of the carrier gas. The heating event temperature refers to the temperature of the heating zone within which the particles are located during the event. The temperature of the particles may or may not be at equilibrium with the temperature of the heating zone. The degree to which temperature equilibrium is reached will depend upon factors such as residence time, particle size, particle formulation, and the like. Regardless, the particle clusters become hot enough during the event so that at least some of the particles of a cluster are fusingly associated with other particles of the cluster via coalescence, diffusion; bonding, melt-phase blending, and/or the like.

The volume fraction, or density, of particle matter in the fluidized material can impact the effectiveness of the heat treatment. If the volume fraction of particulate matter in the heating zone is too high, too many inter-particle collisions may occur during heat treatment, resulting in more inter-particle cluster agglomeration than is desired. On the other hand, there is really no lower limit on density from a technical perspective, although if the density is too low, the product output of the heat treatment per unit time may be too low to be as economically practical as desired. The upper limit on volume fraction is a practical one as well. If the density of fluidized material is too great, too many collisions might occur that would tend to cause undue inter-particle agglomeration. As general guidelines, fluidizing about 1 to about 100, preferably about 1 to about 20, more preferably about 10 kg/hr of solids per about 200 to about 10,000, preferably about 500 to about 2000, more preferably about 900 ft$^3$/hr of carrier gas would be suitable in the practice of the present invention Preferably, the temperature of the heating zone is at least about 10° F., more preferably at least about 25° F., more preferably at least about 50° F. and more preferably at least 100° F. greater than the glass transition temperature or melting point, as the case may be, of at least one constituent of at least one of the particle components. Contrary to conventional wisdom, hotter, more intense temperatures are preferred in the practice of the present invention as this allows desirable fusion to occur in a short enough time interval to avoid undue chemical advancement and/or temperature degradation effects. The melted material also has lower viscosity at higher temperature, which helps the melted material to wet coat, blend with, diffuse into, or otherwise interact more easily with other materials. As general guidelines, the preferred temperature(s) of the heating zone may be in the range of about 50° F. to about 1500° F., preferably about 200° F. to about 750° F., more preferably about 250° F. to about 500° F., for a time period in the range of about 0.1 seconds to about 5 minutes, preferably about 0.1 seconds to about 20 seconds, more preferably about 0.1 seconds to about 10 seconds.

Such intense, flash heating under these preferred conditions tends to completely melt those particles having a Tg or melting point well below the temperature of the heating zone. This causes such fully molten particles to partially and/or fully coat, coalesce with, and/or otherwise mix or diffuse with one or more of the other particles. The identity of the fully molten material as discrete particles in this embodiment is completely lost as a result. In some embodiments in which ordered mixtures are being processed, this is known because the guest particles by themselves become completely spheroidal as a result of flash heating. In other embodiments, only the hosts fully melt, particularly when the guests constitute inorganic constituents. In others, except for inorganic material, both the hosts and guests may melt fully.

The heat source that supplies energy to accomplish the heating event may be any heat source capable of providing enough heat energy to accomplish the desired degree of heating for the desired time interval. Examples of heat sources include heated gas, ultraviolet lamps, infrared lamps, microwave energy, electron beam energy, acoustic energy, induction heating, radio frequency energy, combinations of these and the like. The type of heat source most conveniently used is not critical and will depend to a high degree upon the type of equipment used to fluidize and heat treat the particle mixture.

Surprisingly and unexpectedly, the preferred flash heating conditions are compatible with temperature sensitive ingredients. This is counterintuitive because of the exceptionally high temperature(s) of the heating zone(s). One might expect the intense temperature of the process to damage these ingredients, cause them to react, or otherwise be affected by the high temperature. This is not the case, however. It has surprisingly been discovered that the heat event temperature and residence time of the particles to exposure to the heat event may be selected to be long enough to melt at least some of the materials, but short enough to avoid undue temperature-related phenomena, e.g., catalytic or curing reactions. Thus, surprisingly, a mutually reactive set of species may be separated into separate particle components, with softening or melting and subsequent rehardening taking place at a faster rate than the components chemically react with each other. In preferred embodiments in which mutually reactive sets of species are supplied in separate particulate components, the present invention beneficially exploits this difference between reactivity rates and softening and rehardening rates.

The fluidizing and associated heating event of the present invention may be carried out in any suitable equipment or combinations of equipment in batch or continuous fashion, although continuous embodiments are preferred. For illustrative purposes, FIG. 1a schematically shows one apparatus 10 for fluidizing and heating the particle mixture in accordance with the present invention using a continuous process. Apparatus 10 is similar to equipment described in U.S. Pat. Nos. 2,976,574; 4,154,871; and 3,548,782. Such equipment has generally been used in the past as spheroidizers, but they find unique application in the present invention to help make composite particles.

Apparatus 10 includes vessel 20 defining chamber 14. Particle feed conduit 22 serves as at least one line through which one or more flow(s) of fluidized particle mixture are introduced into the chamber 14 proximal to the top of vessel 20 through inlet 16. Treated material exits vessel 20 through outlet 24. Particle removal conduit 34 connects outlet 24 to a suitable separator 38, e.g., a cyclone separator, where the treated material is recovered from the carrier gas. Blower 42 is coupled to cyclone separator via line 44 and helps to draw air through the system as required to help maintain adequate flow and cooling of the material being treated. Solid product is recovered from cyclone separator 38 through line 40.

Heating energy is introduced into vessel 20, as shown in the present embodiment, through at least one hot air feed 24, and preferably through a plurality of hot air feeds 24 and 26. Hot air feeds 24 and 26 introduce heated gas (preferably heated air) toward a heating zone 30 proximal to but slightly downstream from inlet 16. Consequently, particles introduced into vessel 20 enters this heating zone 30 to begin the heating event and exits the zone 30 to end the event as to those particles. On average, it is believed that a particular particulate cluster of the feed tends to traverse the heating zone about once during the total residence time that the feed is inside vessel 20 and tends to move through zone 30 at about the bulk velocity of the feed through vessel 20.

The temperature of the hot air supplied to heating zone 30 is typically at a temperature of from about 50° F. to about 1500° F., and more preferably from about 400° F. to about 800° F., although the actual heat source itself may be considerably higher, such as about 900° F. Residence time in the flash heating zone 30 is relatively brief, e.g., about 2 to about 10 seconds being typical. The temperature of the hot air and the heating zone 30 may not be the same. For example, in a preferred embodiment, 900 ft$^3$/hr of hot air at 900° F. may be co-introduced to vessel 20 with 900 ft$^3$/hr of a feed containing 10 kg/hr solids at 25° C. Under such circumstances, the hot air is for practical purposes diluted in half. Consequently, the heating zone 30 will be constituted by 1800 ft$^3$/hr of hot air at about 450° F. to 460° F. or so.

Relatively cool air is supplied to vessel 20 through cold air conduits 32. Preferably, cold air conduits 32 introduce air circumferentially into vessel 20. This helps to keep solids material off the inside walls of vessel 20. The circumferential flow of cooling air also helps to rapidly cool feed material after it leaves the heating zone 30. As an alternative to introduction of ordinary air, other gas(es) may be used (for example, nitrogen) for cooling the particles. As shown in FIG. 1a, at least some of the cool air enters chamber 14 through conduits 32. Optionally, all or a portion of cooling air may be introduced through one or more other inlets (not shown) at other locations, e.g., at the top of vessel 20.

The cool air generally is at a temperature below the lowest glass transition temperature or melting temperature of any component in the associated particles, and preferably is at room temperature. The flow rate of this cool air is generally at least twice and more preferably at least ten times the flow rate of the feed material. In a typical mode of practice for pilot scale applications, for instance, the feed is supplied as 5 kg/hr to 100 kg/hr, preferably 10 kg/hr of solids in a carrier gas flowing at about 900 ft$^3$/hr at about room temperature, hot air at about 900° F. is supplied from two lines at a total flow rate of about 900 ft$^3$/hr, and the cool air is introduced through conduits 32 at a total flow rate of about 36,000 ft$^3$/hr. The actual flow rates of materials, of course, may vary over a wide range as desired, with flow rates for commercial use being substantially greater.

The relatively huge volume of cooling air relative to heating air helps to limit the volume fraction of chamber 14 occupied by the heating zone 30. This is beneficial. Firstly, if heating zone 30 were to be too large, solids material might tend to stick to the inside walls of vessel 20, requiring service. Secondly, limiting the size of the heating zone helps to keep the duration of the heating event relatively short. Thirdly, limiting the size of the heating zone helps to ensure that material leaving the zone 30 is rapidly cooled, which is desirable to prevent undue agglomeration.

The particulate mixture may be subjected to treatment in vessel 20 in one or more passes to create composite particles having residual domains from a second particle coalesced therewith. The residual domains comprise from about 0.1 to about 30% of the total weight of the composite particles. Additional passes may be accomplished by recycling the flow of particles back through the same heating zone and/or by passing the flow through one or more additional zones. Additional passes may be used to add additional layers to the particles, to further coat the particles with additional guest particles, to further melt and coalesce the ingredients, or the like. Additional "guest" particles can optimally be added at each heating cycle as desired to obtain the target heterogeneous particle chemical constitution. Repeat passes can be used to create layered particles with each layer having a specific function. In a particularly preferred embodiment, the heterogeneous particles comprise a plurality of layers of residual domains having a chemical constitution differ from one another. Desirably, the residual domains at least substantially encapsulate said composite particles. In a preferred embodiment of the present invention, the heterogeneous particles do not contain an adherent such as an adhesive or a wax. Alternatively, binders or fixatives may additionally optionally be incorporated with the associated particles of the present invention for enhanced binding of the particles or for binding functionality of the ultimate coating composition.

Figure 1B:
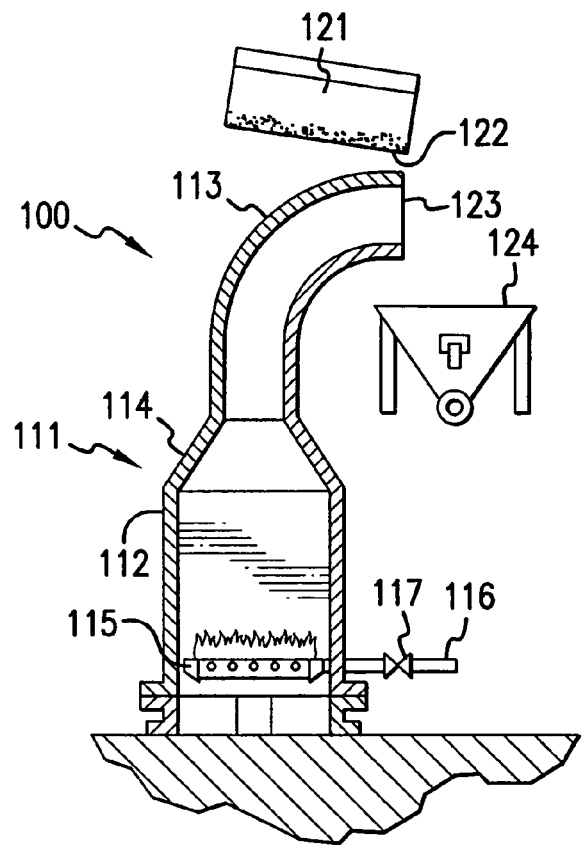
FIG. 1b is an elevation view in cross-section depicting an alternative apparatus for generating heterogeneous particles according to the present invention.
Figure 1C:
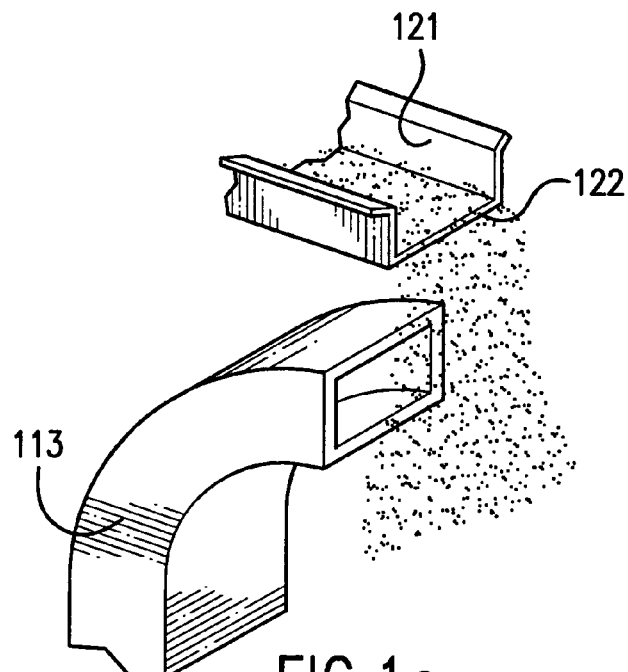
FIG. 1c is an isometric view of a portion of the apparatus of FIG. 1b.

FIGS. 1b and 1c show an alternative apparatus 100 for practicing the invention. The apparatus 100 is similar to that described in U.S. Pat. No. 3,263,980. Apparatus 100 is provided with heating chamber 111 having a cylindrical shell 112 and a hot gas delivery conduit 113. The reducing section 114 interconnects the cylindrical shell 112 and the delivery conduit 113. Within the cylindrical shell 112, there is disposed a gas burner 115, and gas supply line 116 outfitted with the control valve 117, connected to the burner. Disposed above the heating chamber 111 is a vibrating conveyor 121 and disposed below and to the right of the hot gas dispensing means discharge conduit 113, is a collecting hopper 124.

In operation, particle clusters are dispensed by a vibrating conveyor 121, and fall as a sheet from the discharge end 122 of the conveyor toward the discharge end 123 of the hot gas dispensing discharge conduit 113. The discharge end 122 of the vibrating conveyor 121 is positioned relative to the discharge end 123 of the discharge conduit 113, so that the material discharged by the vibrating conveyor falls close to but in front of the delivery conduit discharge end 123. The vibrating conveyor 121 serves to disperse the particle clusters, and as the particle clusters fall through the hot gas stream, they are heated so that the separate particle components of the particle clusters are more permanently fixed to each other.

Figure 1D:
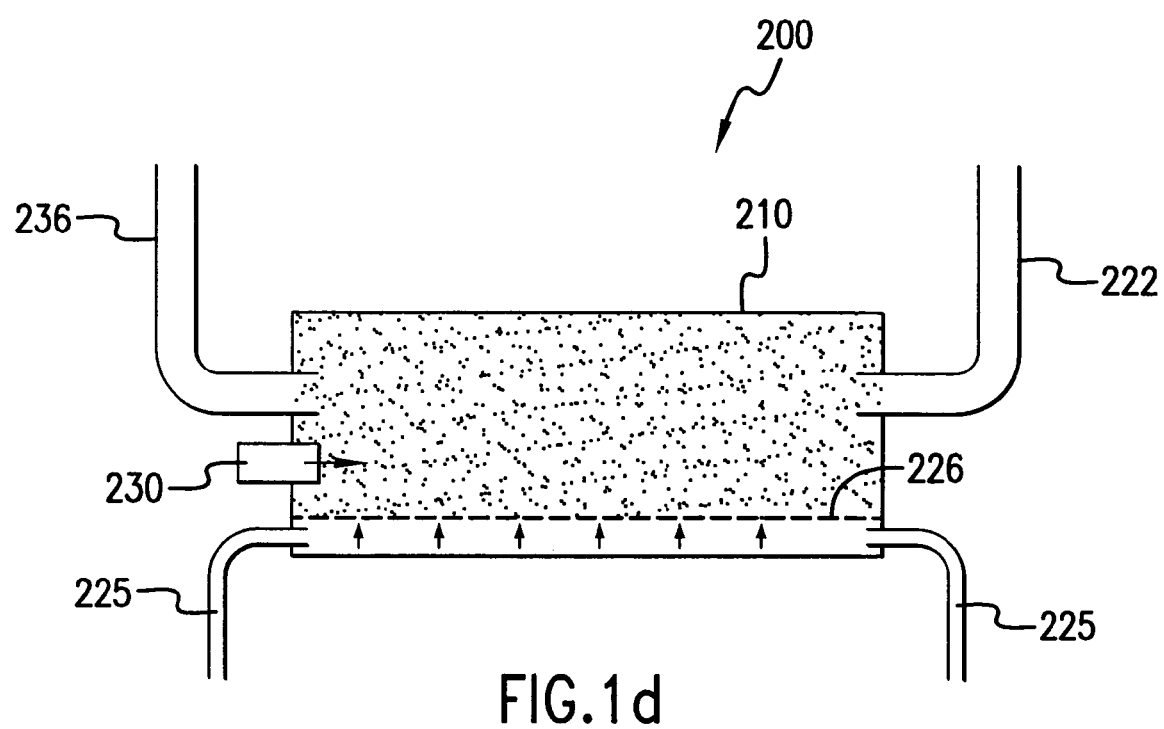
FIG. 1d is a schematic view of an alternative apparatus for generating heterogeneous particles according to the present invention.

FIG. 1d shows yet another apparatus 200 for carrying out the process of the present invention, comprising a vessel 210 having particle feed conduit 222 serving as at least one line through which one or more flows of particle clusters are induced into vessel 210. Air inlet conduits 225 introduce air to the lower portion of vessel 210 below fluidized bed 226. The air flow resulting from the introduction of air into vessel 210 in this manner fluidizes the particle clusters provided in the vessel 210. Focused energy source 230 imparts energy to particles fluidized within vessel 210, thereby more permanently fixing separate particle components of particle clusters to each other. Focused energy source to 230 may be laser, sonic energy source, focused radiation source or any other appropriate source. Preferably, energy is focused to the middle of vessel 210, so that no particles adhere to the sides of the vessel. After completion of the particle cluster treatment process, particles are withdrawn through particle outlet conduit 236.

The above discussion has described those embodiments of the invention that involve a mixing step, a fluidizing step, and then a heating event step. Other modes of practicing the present invention allow the initial mixing step to be incorporated into the fluidizing step so that both are, for practical purposes, accomplished at the same time and/or in overlapping fashion. Specifically, ingredients comprising two or more particulate components may be mixingly fluidized under density conditions such that some greater degree of collision between particle components is allowed to occur during fluidizing than is preferred with the mode of practice described above. While being fluidized in this manner, the mixture is subjected to a heating event for a controlled duration. During the heating event, colliding particles, which may be softened or fully molten at the time of collision, will tend to fusingly agglomerate to form composite particles of the present invention. The density of the fluidized mixture will impact the size of the resulting composite particles. If the size of the composite particles is too large, this indicates that too many collisions are occurring. The volume fraction of particles in the fluidized mixture can be lowered until the desired composite particle size is achieved. Likewise, if the size of the composite particles is too small, this indicates that too few collisions are occurring. The volume fraction of particles in the fluidized mixture can be increased until the desired composite particle size is achieved.

In view of the above discussion of illustrative modes of practicing the present invention, it can be readily appreciated that the present invention provides tremendous flexibility in easily formulating a wide range of powder coating powders from ingredients with collective properties not so easily achieved using conventional approaches. Generally, the ingredients used to form composite particles of the present invention will comprise at least one film-forming resin and optionally at least one colorant, which may be one or more colored pigments and/or one or more colored dyes. The film-forming resin(s) may be thermoplastic, thermosetting, or combinations thereof. Thermosetting systems include those that are radiation curable, thermally curable, otherwise chemically curable, and/or the like. The type of resin(s) used is not critical and any resin or combination of resins may be used that are now or hereafter known or determined to be suitable for use in powder coating compositions. Examples of such resins include epoxy, polyester, acrylic, polyurethane, polyimide, polyamide, polyimideamide, fluorinated polymer, polysilicones, polyethers, polyurethane, polyurea, polysulfone, polystyrene, combinations of these, and the like.

In some instances, it may be desirable to use a particular combination of resins, yet the combination of resins may be incompatible for one reason or another. In some cases, the physical properties may be so different so that the materials are difficult to co-process using conventional practices. For example, one resin may have high Tg and high molecular weight, while another resin my have low Tg and low molecular weight. According to the present invention, each such resin can be incorporated into distinct particles, respectively. The distinct particles may then be assembled into associated clusters, fluidized, and then subjected to a heating event so as to construct composite particles from the otherwise incompatible ingredients.

In a specific example, host particles may be made from a low Tg resin material, while guest particles may be formed from a higher Tg resin (or vice versa). An ordered mixture can be created in which the guest particles cover the surfaces of the host particles. After being fluidized and subjected to a heating event, the high Tg guest particles may be coalesced into a temperature resistant shell that encapsulates the lower Tg material. The resultant composite is stable and would show good shelf life.

In other instances, two resins may be so different chemically as to be quite immiscible with each other. Immiscible resins can be difficult to co-process using conventional practices. Using the formulation strategy above, however, the resins can be incorporated into distinct particles, and these particles can then be assembled into composite particles of the present invention via mixing, fluidization, and subjecting to a heating event.

When the film-forming resin(s) have thermosetting characteristics, the ingredients may further comprise one or more of constituents of a curing system such as a curing agent, a catalyst, and/or an initiator as desired. These may be selected and used in amounts in accordance with conventional practices as such are constituted from time to time. However, it is a distinct advantage that greater than conventional amounts of such materials may be readily incorporated into composite particles of the present invention, leading to enhanced curing performance. It is also a distinct advantage that these materials can be incorporated into composite particles in a manner that minimizes the risk of chemical advancement that would be present if the materials were to be co-compounded and co-comminuted in accordance with conventional practices. This is especially advantageous for applications in which powder coatings are formed on temperature sensitive substrates.

For example, the catalyst, curing agent, and/or initiator can be incorporated into at least one particle, optionally with at least a portion of the total film forming resin(s), while other co-reactive ingredients are incorporated into different particles. In this way, the mutually reactive materials may be fabricated separately from the other ingredients but then readily incorporated into composite particles of the invention. In preferred embodiments that follow this strategy, a first plurality of particles incorporate a film-forming resin and a second plurality of particles incorporate a co-reactive constituent of a curing system, such as a catalyst. The first plurality of particles are sized to function as host particles, while the second plurality of particles is sized to function as guest particles (or vice versa). An ordered mixture is created. This is fluidized and then subjected to a heating event to fixedly associate the particles with each other. Each set of ingredients constituting the respective particles is thus processed as needed and the resultant composite particle possesses all of the desired functionality, yet chemical advancement due to premature reactivity during processing is avoided.

In some embodiments, it is highly desirable to incorporate crystalline materials into the composite particles for purposes including functioning as a viscosity modifying agent and/or flow control agent. Although it has been challenging to incorporate crystalline materials into conventional powder coating practice, the present invention makes it extremely easy to incorporate as much crystalline material into composite particles as may be practically desired. In preferred embodiments, the crystalline material may be incorporated into guest particles that are associated onto suitable host particles. These may then be subjected to a heating event to form composite particles. The functionality of the crystalline material is thus available without the processing drawbacks.

Representative crystalline raw materials that could be used in the practice of the present invention include but are not limited to crystalline epoxy resins and epoxy functional curatives such as TGIC (triglycidyl isocyanurate), Dow crystalline epoxy resin RSS-1407 (trade secret) and Kukdo crystalline epoxy YDC 1312 (trade secret); crystalline and semi-crystalline polyester resins such as Uvecoat 9010 from UCB; crystalline polyether resins such as Uracross P-3307 from DSM; crystalline acid curatives such as DDDA (dodecanedioic acid), azeleic acid, adipic acid, succinic acid, pimelic acid and sebacic acid.; anhydride curatives such as pyromellitic dianhydride (PMDA), 3,3',4,4'-benzophenonetetracarboxylic dianhydride (BTDA), amine functional curatives such as dicyanodiamide and 4,4'-diaminodiphenyl sulfone; hydroxy functional curatives such β-hydroxyalkyl amide (Primid XL-552 from Rohm & Haas); crystalline additives such as photoinitiators (Irgacure 819 and Irgacure 2959 from Ciba-Geigy), catalysts such as Vestagon B31 from Huls and Dyhard PI from, solid plasticizers such as sucrose benzoate, pentarythritol tetrabenzoate and cyclohexanedimethanol dibenzoate (Benzoflex 352 from Velsicol); flow modifiers such as polyolefin waxes such as Lanco Wax TF-1780 and TF-1830; degassing agents such as benzoin; UV absorbers such as Tinuvin 622 and Tinuvin 144 from Ciba-Geigy, and antioxidants such as Irganox 1010 and Irganox 1076 from Ciba-Geigy; combinations of these, and the like.

In some embodiments, it is highly desirable to incorporate metal flakes, micas, inorganic particles or fibers, or other types of material into powder coating compositions. As used herein, "metal" refers to metals, alloys, intermetallic compositions, and the like. However, it has been challenging to accomplish this using conventional practices in a manner that avoids degrading the characteristics of such metal materials in that metal pigments can be damaged too easily by conventional extrusion or grinding. The present invention, however, makes it easy to incorporate metal flakes or the like into the composite particles with very little if any degradation of the flakes. Small metal flakes may be used as guest particles, incorporated into guest particles, and/or incorporated into host particles. A film forming resin and optional other ingredients may be incorporated into host particles (or guest particles). These hosts and guests are mixed to create an ordered mixture, fluidized, and then subjected to a heating event. After being subjected to a heating event, the metal flakes would be firmly attached to the resultant core of the composite particles. The composition of the composite would be stable over time, which is important for storage stability, good transport properties, coating uniformity, and reclaiming, while the integrity of the metal flakes is preserved.

In addition to the kinds of ingredients noted above, composite powder coating compositions may additionally incorporate a wide variety of other additives as are now or hereafter known to be suitable for use in powder coating compositions. These additives include, without limitation, colorants, fillers, slip additives, UV stabilizers, antioxidants, fluidizing agents, flow control agents, agents that modify surface tension, degassing agents, flexibilizing agents, coalescing agents, texturizing agents, antistatic agents, gloss modifying agents, luster agents (such as metal flakes), fungicides, bactericides, strengthening agents, toughening agents, biological agents, combinations of these, and the like. In those embodiments of the invention formed from ordered mixtures, any of these optional ingredients may independently be incorporated into the host particles, the guest particles, a post-add blended with the product of the heating event, or combinations of these.

The heating event of the present invention tends to reshape the morphology of the particle clusters being treated. In many instances, the particles tend to lose their individual identities as they fusibly incorporate with other particles via coating, diffusion, coalescence, and/or the like. This is particularly the case for the smaller "guest" particles of an ordered mixture. Along with the "guest" particles, fine particles that may be present due to the grinding process used to generate the "host" and/or "guest" particles are also fused into the larger particles. In practical effect, the drawbacks associated with such fines are substantially avoided. These fines are naturally attached through the same type of forces that attract and hold the guest particles. Thus the outside layer can be a combination of fine core materials and guest particles. Depending on the composition and the process conditions used, preferred composite particles tend to be more spherical in shape than the particle clusters from which they were formed. A degree of spheroidization is observed even with a single pass through a heating zone, but is more significant in connection with multiple passes.

The fact that the present invention helps to reduce the amount of fines in a powder coating composition is a distinct and significant advantage. Fines have been a problem both during the course of manufacture of powders as well as during their use to coat substrates. There has been a strong bias in the industry to avoid fines or other small particulates as much as is practical. The present invention proceeds contrary to this bias by teaching how fines and other small particulates, e.g., guest particles, can actually be used beneficially in powder coating compositions.

Figure 2:
FIG. 2 is an SEM at a magnification of 1150× of an associated particle mixture of first and second particles (host and guest particles) prior to being subjected to a heating event.

FIG. 2 is an SEM of an associated particle mixture of first and second particles (host and guest particles) prior to being subjected to a heating event of the present invention. The host particles include a pigmented, thermosetting, film-forming polyester resin and are about 25 micrometers in size. The guest particles comprise catalyst and are about 2 to 3 micrometers in size. The mixture includes about 2 parts by weight of the guest particles per about 100 parts by weight of the resin in the host particles. The smaller particles can be seen to be associated on the surfaces of the host particles, which is evidence of an ordered mixture. There is no evidence of fusion of the second particles to the first particles, and all of the edges of the first and second particles are generally jagged, indicating that they have not been subjected to an amount of heating energy that might cause softening or melting.

Figure 3:
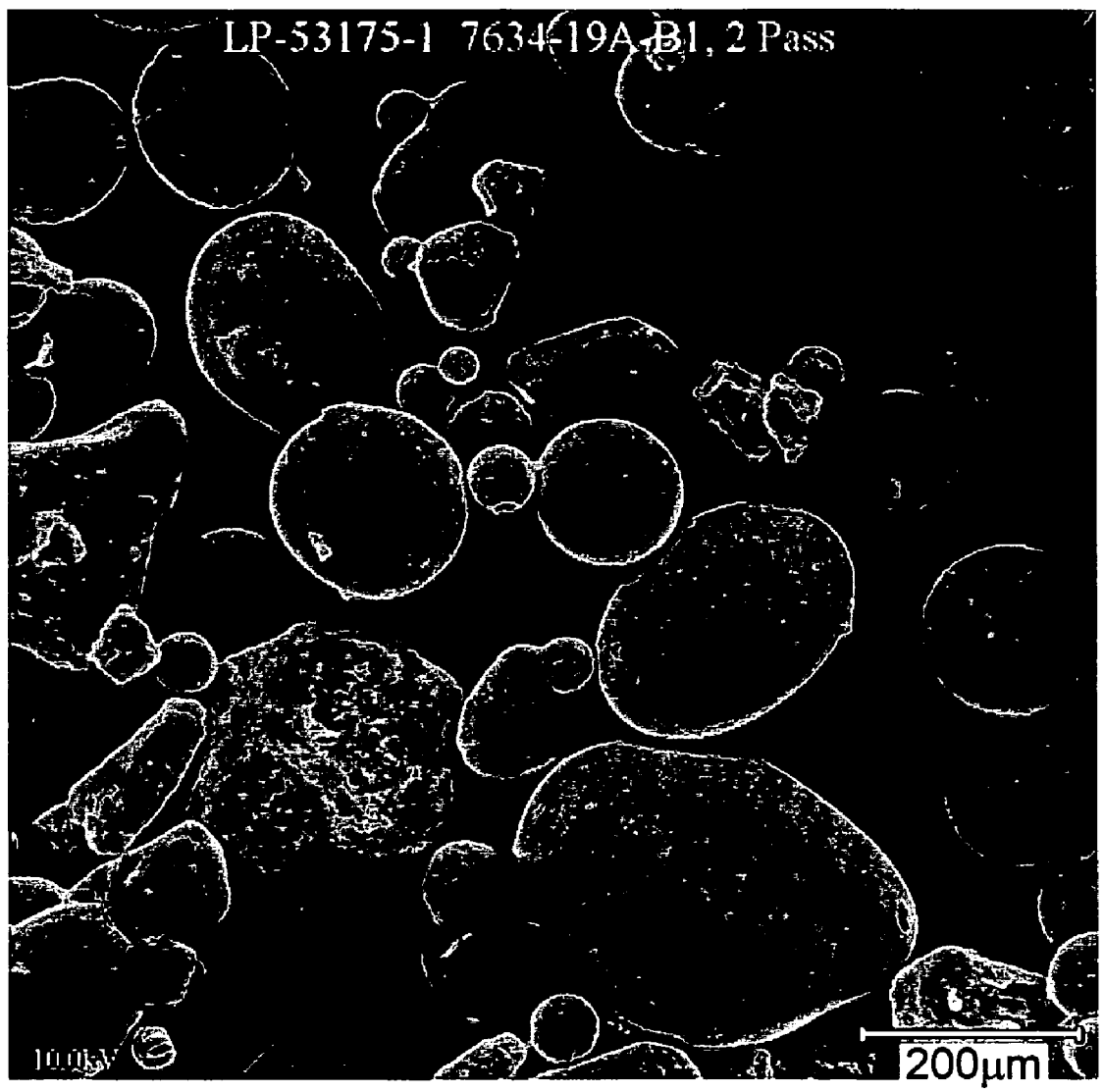
FIG. 3 is an SEM at a magnification of 1150× of the associated particle mixture of FIG. 2 after 2 passes through a heating event in which heating air supplied at 700° F. (heating zone about 375° F.).
Figure 4:
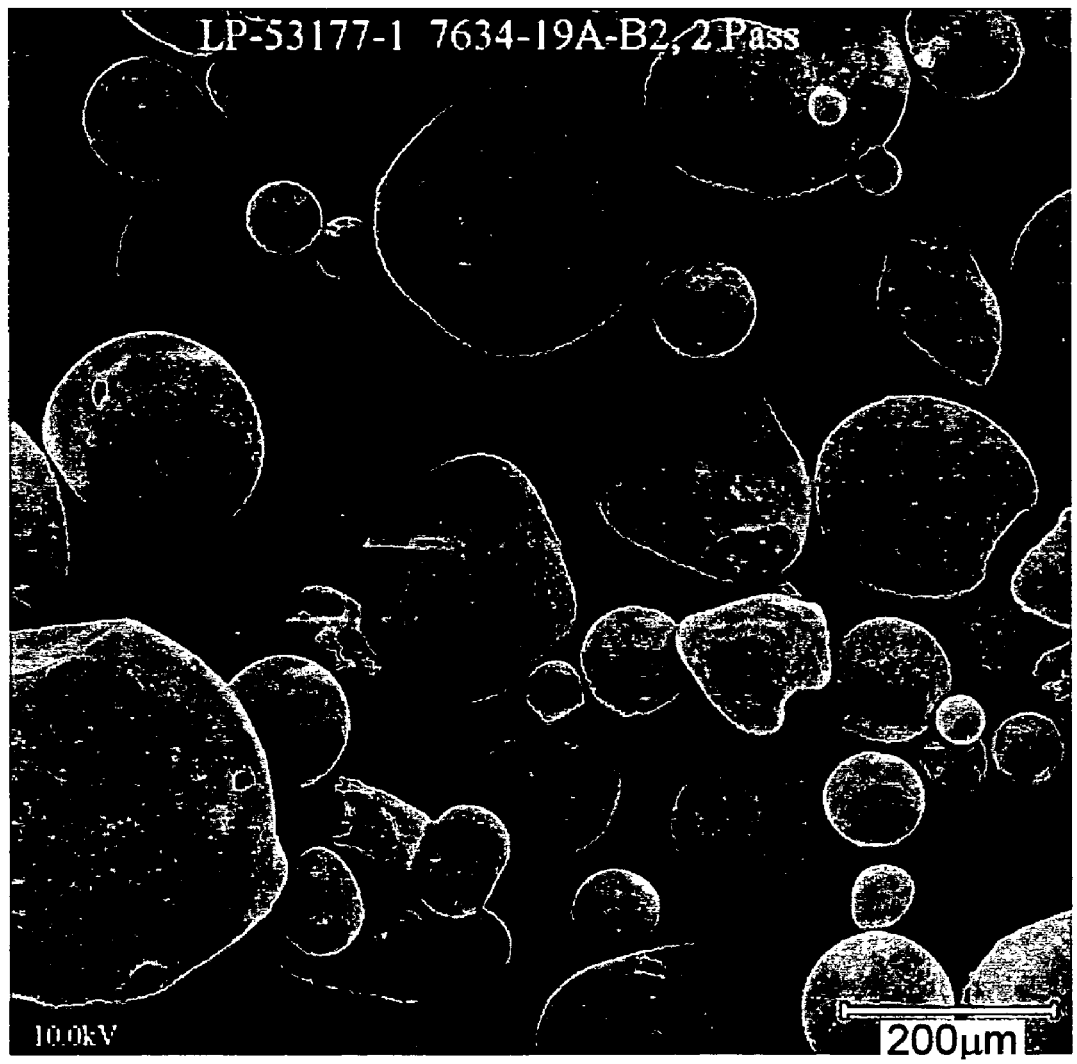
FIG. 4 is an SEM at a magnification of 1150× of the associated particle mixture of FIG. 2 after 2 passes through a heating event in which heating air supplied at 800° F. (heating zone about 425° F.).
Figure 5:
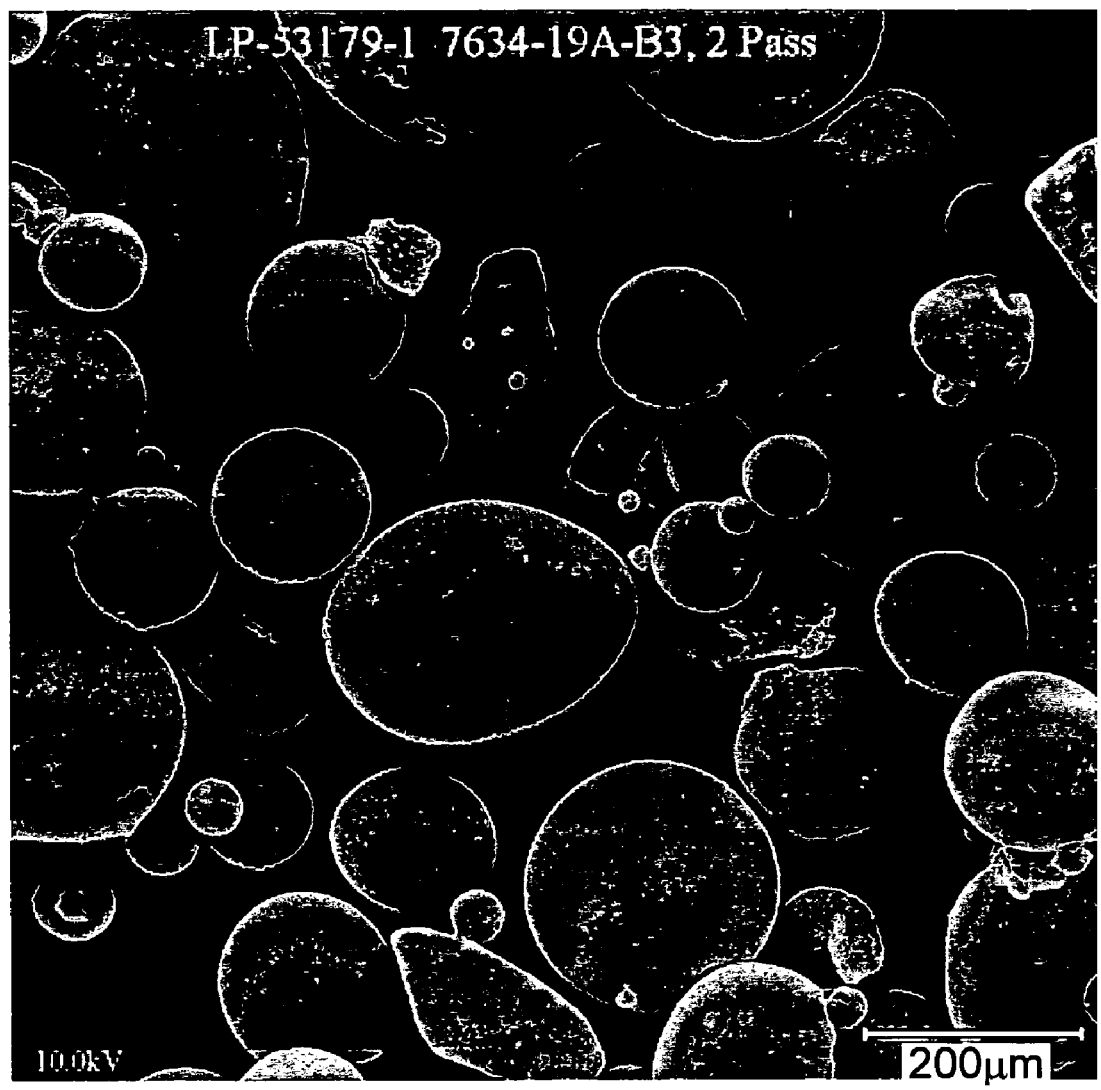
FIG. 5 is an SEM at a magnification of 1150× of the associated particle mixture of FIG. 2 after 2 passes through a heating event in which heating air supplied at 900° F. (heating zone about 475° F.).

FIGS. 3 through 5 show samples of this same ordered mixture after being heat treated for two passes through the equipment shown in FIG. 1a at various temperatures. In all instances, heating causes the smaller particles and larger particles to coalesce together. Some rounding of the host particles is observed. The impact of heating, e.g., coalescence and rounding, is more significant with increasing temperature.

Figure 6:
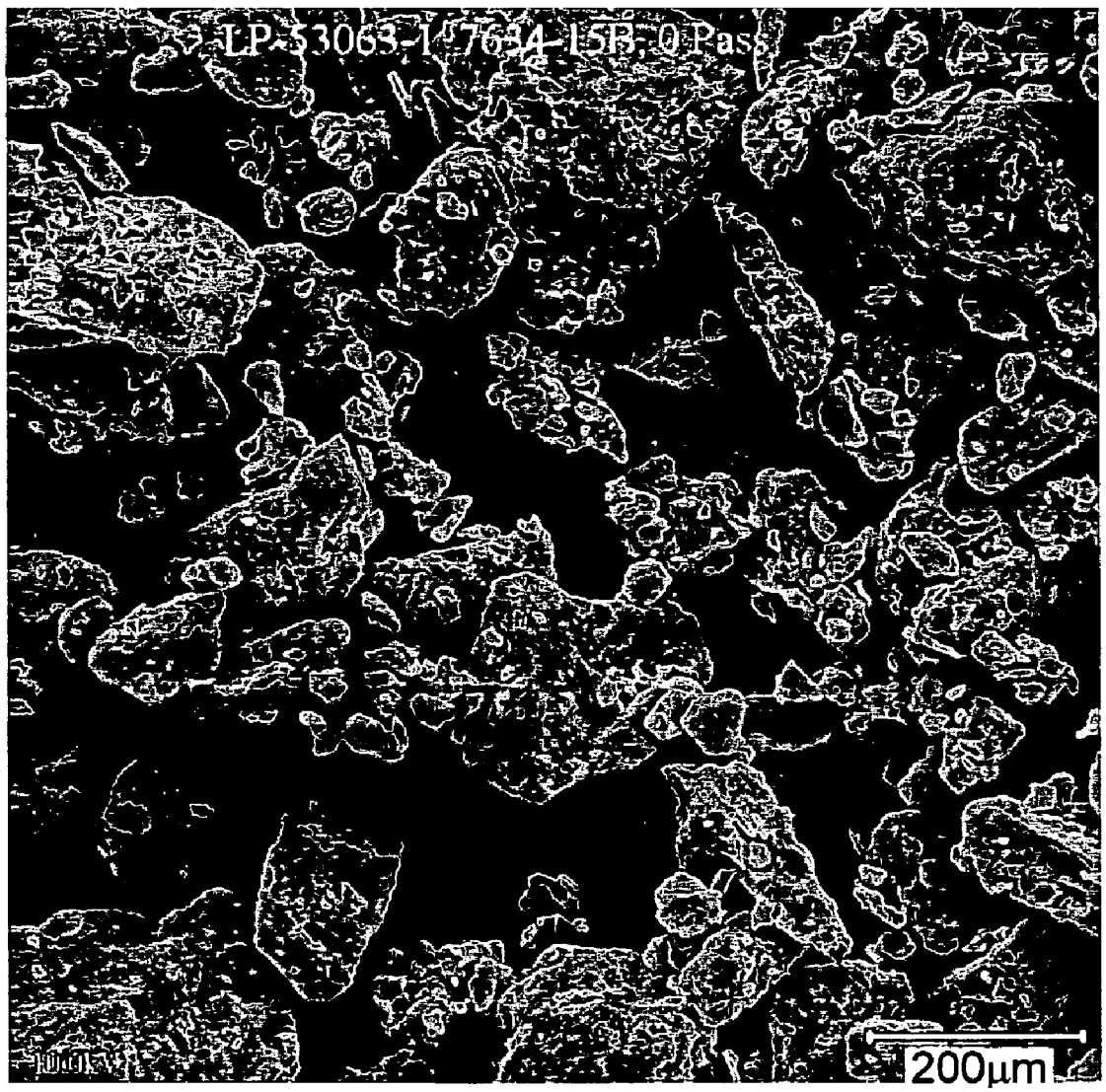
FIG. 6 is an SEM at a magnification of 1150× of an associated particle mixture of first and second particles (host and guest particles) prior to being subjected to a heating event.

FIG. 6 is an SEM showing an associated particle mixture of first and second particles (host and guest particles) prior to being subjected to a heating event of the present invention. The host particles comprise a pigmented, radiation curable, film-forming polyester resin and have a particle size of about 20 to 30 micrometers. The guest particles are a crystalline material and have a particle size of about 5 micrometers. The large, rectangular particles are inorganic Wollastonite used as a filler. The mixture contains about 12.5 parts by weight of the guest particles per about 100 parts by weight of the host particles. The guest particles can be observed on the surface of the host particles. The smaller particles are also believed to include fines created in the manufacture of the host particles.

Figure 7:
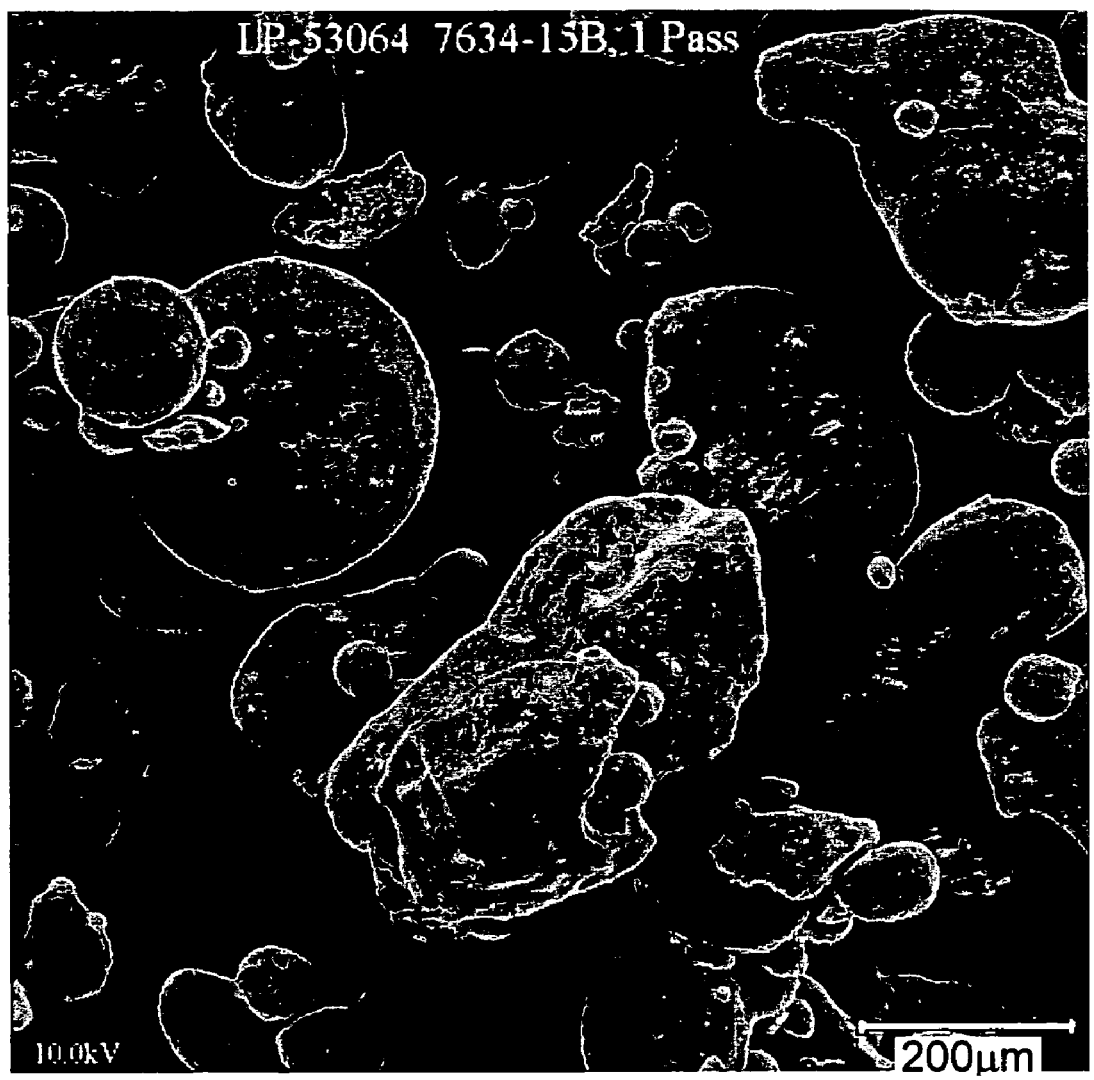
FIG. 7 is an SEM at magnification of 1150× of the associated particle mixture of FIG. 6 after being subjected to a single heating event with hot air supplied at 800° F. (heating zone about 425° F.).
Figure 8:
FIG. 8 is an SEM at magnification of 1150× of the associated particle mixture of FIG. 6 after being subjected to three passes of a heating event with hot air supplied at 800° F. (heating zone about 425° F.).
Figure 9:
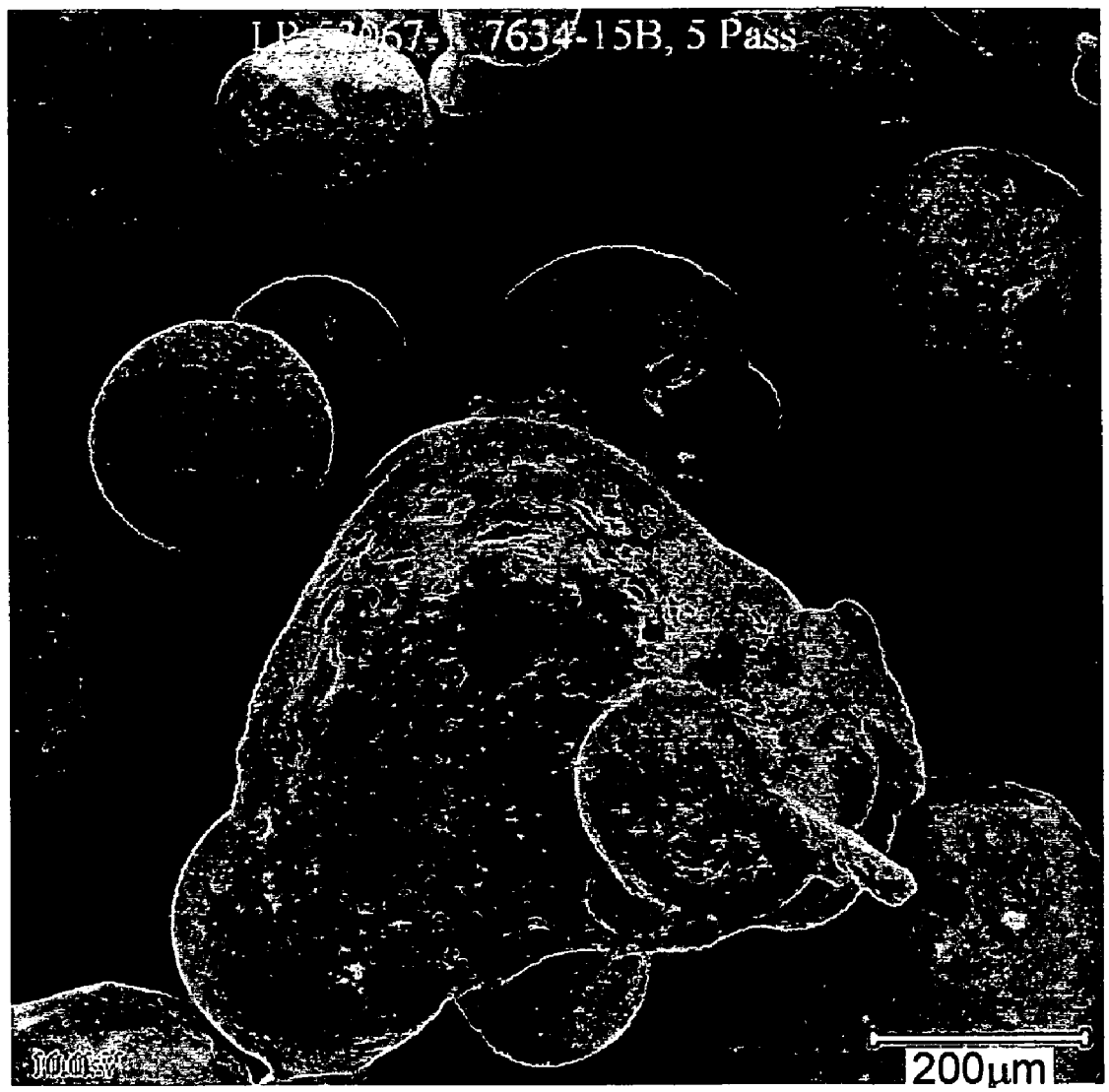
FIG. 9 is an SEM at magnification of 1150× of the associated particle mixture of FIG. 6 after being subjected to five passes of a heating event with hot air supplied at 800° F. (heating zone about 425° F.).

FIGS. 7 through 9 show the ordered mixture of FIG. 6 after being heat treated in the apparatus of FIG. 1 one or more times. In all instances, heating causes the smaller particles and larger particles to coalesce together. At least the small, guest particles are fully rounded, indicating that at least these particles fully melted. Significant rounding of the host particles also is observed. The impact of heating, e.g., coalescence and rounding, is more significant with increasing passes. The large Wollastonite particles are at least partially engulfed in coatings of the organic material.

In many embodiments, construction of the composite particles is complete after being subjected to one or more heat treatments in equipment such as the apparatus 10 shown in FIG. 1a. Further processing via agglomeration or comminuting is generally not needed to render the composite particles suitable for incorporation into a powder coating composition, although sieving may be desirable to further enhance the particle size uniformity of the final product. However, such composite particles may be blended or otherwise incorporated with other ingredients in order to finalize the desired powder coating composition. For example, a so-called "post-add" of conventional additive(s) may be mixed with the blended particles for any desired purpose such as to promote fluidizability characteristics and to prevent agglomeration among the heterogeneous particles. A representative post-additive includes 0.1 to 0.2 weight percent of inorganic particles (e.g., $SiO_2$ and/or alumina particles having a size of about 20 nm) that may be mixed into the heterogeneous particle product.

The powder coating compositions prepared according to the method of this invention may be used to coat articles of various shapes and sizes constructed of materials such as glass, ceramics, polymers, paper, wood, fabricated panels (e.g., particle board, medium density fibreboard, chipboard, plywood, paperboard, and the like), metal containing materials, combinations of these, and the like. Because some composite particle embodiments of the present invention are easily constructed so as to be curable at low temperatures, these preferred compositions may be applied to more thermally sensitive substrates. The powder coating compositions of the present invention may be applied onto substrates using any desired application technique now or hereafter known to be suitable to form powder coatings. When applied as a powder coating composition, said particles melt and cure to a hard layer when exposed to a desired temperature for a desired rapid time interval, e.g., less than about 10 minutes, more preferably less than about 1 minute. For temperature sensitive substrates, the temperature may be at or below 300° F., preferably below about 250° F. Where temperature sensitivity is not such a concern, the temperature may be higher than this, e.g., greater than 300° F., preferably about 300° F. to about 500° F.

After application, any unused powder may be reclaimed and reused one or more times. Because the components of the composite particles are fixedly incorporated with each other, the composition of the reclaimed material remains consistent and stable through many use/reclaim cycles.

The present invention thus additionally provides a method for coating a substrate, wherein a powder coating composition containing composite particles as described herein are coated onto a substrate and cured by exposure to heat, ultraviolet irradiation, or other suitable energy as appropriate for the specific powder coating composition so applied.

The invention will now be further illustrated in connection with the following examples.

In the Examples, the following general procedures were used:

General Powder Coating Extrusion and Grinding Process: The material to be extruded was passed through a lab size 30 mm APV twin screw extruder (model MP 30-PC; APV Chemical Machiner, Inc.) using the settings of: 200-500 rpm, 50° F. –250° F. barrel temperature; 20-150 kg/hr. feed rate. The material was cooled on a water cooled chilled roller, chipped into smaller pieces, optionally post add material was added in-line if the host material required it, and then the material was transported to and ground on a Hosakwa Mikropul ACM-10 grinder with an approximate speed of 2000 to 6000 rpm. The ground-powdered material was circulated through a Hosakwa Mikropul 16-VME cyclone separator (510 CFM airflow, 2000 rpm) to a Sweco X-530566 sieve separator equipped with a 165 mesh screen.

40° C. Water Bath Test: This test is a thermal aging test which helps to predict the stability of the product to incidental exposure of semi-elevated temperatures which may occur during transport or storage of the powder in a warehouse. The product is put into a suitable container such as a glass jar with a secure lid. The lid is tightly sealed. The material is placed into a covered, thermostatically controlled water bath stabilized at 40° C. The water level should be such that it does not rise to or above the point where the container's lid seals the container. The material remain in the bath for 7 days after which they are removed and evaluated. Qualitative evaluation can be made by visually looking to see if there is any appreciable clumping of the powder which has occurred (termed "sintering"). Quantitative evaluations can be made by measuring the powder by DSC to determine any changes in its reactivity and curing profiles, as wells as increases in the $T_g$ which may possibly be attributed to chemical advancement.

Scanning Electron Microscopy: A LEO (formerly Leica and Cambridge) S-260 Scanning Electron Microscope was used to evaluate the powder samples. A sample of the powder was mounted on an aluminum SEM sample mounting stub by dusting the powder over double-sided tape applied to the stub. The powder surface was coated with a thin layer of gold to promote surface conductivity and to control surface charging. SEM micrographs were taken at 102×, 1150×, and 5460×.

Powder % Compressibility Measurements: Measurements were made using a Hosokawa Micron Powder Characteristics Tester Model PT-N. The procedures were followed as described in the instrument's operation manual. The formula used to calculate the compressibility is: $C=[(P-A)/P]*100$ [C=Compressibility, P=Packed density, and A=Aerated density].

Particle Size Measurements: Except where specified, particle size measurements were made using a laser light diffraction particle size analyzer (Malvern Mastersizer X) using a dry powder feeder module. The $d_{10}$, $d_{50}$, and $d_{90}$ values that are calculated from the particle size distribution curve which results from the measurement, represent the specific particle diameter by volume in which 10%, 50%, and 90%, respectively, of the powder material is equal to or smaller than that value.

Heating Event (Flash Fusion) General Procedure: An apparatus in accordance with FIG. 1a was used. Unless otherwise noted, the powder material was sprayed into the chamber of the vessel at 10 kg/hr solids in a 900 standard ft³/hr flow of air. The heated zone was created by two nozzles introducing a total of 900 standard ft³/hr of hot air at 800° F. (476° C.). About 36,000 standard ft³/hr of make-up air at 70° F. to 75° F. was also pulled through the vessel. The powder traveled through the heated zone into a collection funnel and through a cyclone separator. The powder was collected from the cyclone separator output. Examples of the equipment design can be found in U.S. Pat. Nos. 2,976,574, 4,243,794, and 4,154,871.

60° Gloss Measurement Procedure: A BYK-Gardner Inc. Haze-Gloss meter (Cat. # 4601) was used to determine gloss of cured films on MDF (medium density fibreboard).

Differential Scanning Calorimetry (DSC) Testing: DSC testing was done on a Perkin Elmer Pyris DSC. The DSC methods used to obtain results were: (1) Curing exotherm enthalpies (ΔH) and peak temperatures, and cured $T_g$'s were obtained from the DSC method–initial temp=0° C., hold for 1 min at 0° C., heat to 240° C. at 20° C./min, cool to 0° C. at 20° C./min; and (2) The Uncured $T_g$ results were obtained from the DSC method–initial temp.=80° C., hold at 80° C. for 0.5 min, cool to 0° C. at 20° C./min, hold at 0° C. for 1 min, heat to 90° C. at 20° C./min.

EXAMPLE 1

Effects of Flash Heating on Particle Size and Thermal Chemical Stability of Powder Coatings Purpose: Traditional powder coatings are generally manufactured at process temperatures between 200° F. and 280° F. and cured at temperatures of 300° F. to 450° F. for 10 to 20 minutes. Powder coating materials are engineered to react rapidly at these cure temperatures to form tough and/or hard coatings. In this study, three different thermally cured powder coating chemistries have been subjected to the high temperatures of the flash fusion process to determine temperature effects on chemical stability, particle morphology and particle size distribution.

Host Preparation: Three powder coatings produced using the standard extrusion and grinding processes were exposed to flash heating to study the effects on particle size distribution (PSD), particle morphology and chemical stability. The formulations are described below:

7634-19A (references Example #5 and #6) with 1.0 part catalyst by weight per hundred parts by weight (phr) resin catalyst, extruded: A pigmented polyester/TGIC texture powder coating formulated to meet rapid cure or low temperature cure standards.

6401-61E (references U.S. Pat. No. 5,905,104): thermal-cure powder coating formulated for surfaces exposed to high temperatures.

7480-22A: A smooth, low gloss, epoxy-acrylic hybrid thermal-cure powder coating formulated to meet rapid cure or low temperature cure standards.

Guest Preparation: Chemically distinct guest particles were not added to the host material. Instead, for simplification of the experiment, the fines from the host particles fines (i.e., those host particles less than 10 μm in diameter) were used as the guest particles.

Flash Fusion: The powders were subjected to flash fusion according to the general procedure. A number of samples were run through multiple passes with retains taken at each pass.

Evaluate: The powders were analyzed for particle size distribution and for changes in the Tg of the uncured resin.

Powders also were tested by DSC to determine if the Tg's of the uncured resins in the powder coating had shifted due to chemical advancement. The DSC data compares the Tg after standard manufacturing processes (the 0 pass samples) with the same material after it has been passed through the flash fusion process (1 pass, 2 pass and 3 pass samples). For all three-powder coating formulations there was no appreciable change in uncured Tg. This provides evidence that there is negligible chemical advancement of the curing resins that occurs in the flash fusion process for these materials.

TABLE 1.1

Tg results of 7634-19A, 6401-61E, and 7480-22A.

| Sample ID | 7634-19A (° C.) | 6401-61E (° C.) | 7480-22A (° C.) |
|---|---|---|---|
| 0 Pass | 54.8 | 46.6 | 45.7 |
| 1 Pass | 53.5 | 45.8 | 46.2 |
| 2 Pass | 54.9 | 46.9 | 46.7 |
| 3 Pass | 54.7 | 47.4 | Not tested |

Particle size distribution data was determined using an LS-230 with a variable speed fluid sample module using filtered tap water as the transport medium (Beckman Coulter, Inc.). The samples were suspended in water using a small amount of non-ionic surfactant and mild sonication. The samples were run using mild sonication during the data collection scans. Care was taken in the analysis of the results to ensure that a proper refractive index was used and that there were no bubbles present on the distribution curve, which could lead to erroneous results.

The LS-230 has a measurable range of 0.040 μm-2000 μm and was chosen in order to demonstrate the effect that occurs on the fine particles after passing through the flash fusion step. For powder coating application purposes, "fines" are small resin particles or guest particles that are less than 10 μm in diameter. The fine particles have the most significant effect on the number average mean particle diameter result from a particle size distribution analysis. The fines also have a strong influence on the $d_{10}$ particle size distribution results. The largest total number of particles in conventionally produced powder coating are generally less than 2 μm in diameter. This is easily demonstrated by measuring the number average mean diameter of the powder using testing equipment capable of accurately measuring these particles. It is also supported by visual inspection of SEM micrographs.

Table 1.2 shows a clear and significant shift in the number average particle size after a single pass through the flash fusion process (data in column 6). The shift in the volume average particle size data is much less pronounced. The largest percentage shift in the volume average data occurs with the $d_{10}$ result. Both the $d_{10}$ and the Number Average Mean Diameter results are indicators of the number of fine particles present and their average diameters. The increases in these values provide evidence of fusion of the fines onto the surface of the host particles during the flash fusion step. The very small increase in the $d_{50}$ and $d_{90}$ values is evidence that large-scale host particle agglomeration is not occurring in the process.

TABLE 1.2

The particle size distribution data for 7634-19A for 0 and 1 pass through the flash fusion process.

| | Particle Size Distribution (by volume) | | | | Mean Particle Size (by number) |
|---|---|---|---|---|---|
| Passes | $d_{10}$ | $d_{50}$ | $d_{90}$ | Mean | |
| 0 | 9.5 μm | 30.0 μm | 56.2 μm | 32.2 μm | 0.11 μm |
| 1 | 15.7 μm | 34.1 μm | 56.1 μm | 35.1 μm | 8.41 μm |

EXAMPLE 2

Method of Adding Crystalline Resins to a Powder Formulation

Purpose: It has been long known that crystalline additives and resins can significantly reduce the melt viscosity of powder coatings and thereby increase surface smoothness. However, the traditional powder manufacturing process is not well suited for mixing these types of raw materials, especially at high levels. This study demonstrates that the flash fusion process can be used to attach crystalline materials onto host particles providing the desired rheological benefits without the unwanted lowering of the powder Tg and subsequent physical stability problems.

Host Preparation: The host formulas used in this experiment are presented in the following table. Each formulation was moderately mixed in a laboratory-scale high-intensity mixer. The material was then extruded and ground according to the process described in the "General Powder Coating Extrusion and Grinding Process" section.

Sample J was a control sample with all of the crystalline resin (Uracross 3307) added in the standard extrusion process. Sample E added a portion of the crystalline resin in the extrusion process and the bulk in the subsequent mixing/flash fusion process. Sample B added all of the crystalline addition through the mixing and flash fusion process. All three formulations were chemically identical once the crystalline resin was added to the B and E samples in the mixing/flash fusion process. Differences in performance were due to particle processing rather than chemical composition.

Sample B (with no crystalline resin) was processed in a 30-mm twin-screw extruder without difficulty. Sample E (which contained a portion of the Uracross 3307) hardened slowly and tended to stick to the chilled rollers. It was not completely hardened on reaching the grinder and was somewhat difficult to grind. The sample E host powder was stored at approximately 20° C. to avoid sintering.

Sample J (extruded control) could only be processed on a laboratory-scale extruder. The extrudate had to be placed in the freezer for an extended period of time before it could be ground. It could not be run in a continuous operation since it hardened very slowly. Once ground it sintered into a solid block unless it was stored under low temperature conditions (less than 20° C.).

TABLE 2.1

Host Formula Table for Crystalline Addition Experiment

| Raw Materials | Base Resin Formula (wt. %) 7634-15B | Base Resin Formula (wt. %) 7634-15E | Control Sample 7634-15J |
|---|---|---|---|
| Uracross P 3125 (Unsaturated polyester resin from UCB) | 61.03 | 58.45 | 52.25 |
| Uracross P 3307 (Crystalline polyether resin from UCB) | 0.00 | 4.23 | 11.11 |
| Irgacure 819 (Photo-initiator from Ciba-Geigy) | 0.74 | 0.70 | 0.65 |
| Irgacure 2959 (Photo-initiator from Ciba-Geigy) | 0.37 | 0.35 | 0.33 |
| Resiflow P-67 (Coalescing agent) | 1.10 | 1.06 | 0.98 |
| Nyad 325 Wollastonite (Filler) | 18.38 | 17.61 | 16.34 |
| Tiona RCL-2 Titanium Dioxide (Pigment) | 18.38 | 17.61 | 16.34 |

Host Particle Size: Each host formulation was ground to a variety of particle size distributions (identified as coarse, medium and fine) to study the effect of varying host particle size on storage stability and coating appearance. The host particle size information is given in the table below. Data is based on the volume statistics. The $d_{50}$ corresponds to the median particle size by volume.

TABLE 2.2

Host Particle Size for Crystalline Addition Experiment

| Sample ID | 7634-15B Grind Size | | | 7634-15E Grind Size | | |
|---|---|---|---|---|---|---|
| | Fine | Medium | Coarse | Fine | Medium | Coarse |
| $d_{10}$ (μm) | 9.75 | 12.37 | 13.16 | 10.31 | 12.77 | 14.30 |
| $d_{50}$ (μm) | 25.04 | 33.20 | 43.85 | 26.35 | 36.38 | 46.93 |
| $d_{90}$ (μm) | 67.97 | 75.14 | 117.64 | 74.79 | 88.48 | 121.17 |

Guest Preparation: A crystalline polyether resin (Uracross 3307) was micronized using a jet mill. The average particle size by volume of the micronized Uracross 3307 was 2.4 microns. Approximately 0.2% by weight of aluminum oxide was added during the grinding process to prevent clumping of the ground material.

Mixing Operation: To the host powders, micronized Uracross 3307 guest particles were added at the following rates:

12.5 grams of micronized 3307 guest particles per 100 grams of B host particles (11.1% by weight)

7.75 grams of micronized 3307 guest particles per 100 grams of E host particles (7.2% by weight).

Each mixture was V-blended for 30 minutes and then passed through a laboratory-sized MAIC mixer. (Refer to U.S. Pat. No. 5,962,082 for information on the MAIC mixing process).

Flash Fusion Operation: The mixed powders were then subjected to flash fusion according to the general procedure.

Storage Stability: Samples of each grind size were mixed with 0.2 parts per hundred of fumed silica to improve powder flow. The silica was mixed in a lab-scale high intensity mixer at moderate mixing speeds (1000 RPMs for 30 seconds). Finally the samples were sieved through an 80-mesh screen to remove any large agglomerates or contamination formed during any stage of the process. The amount of material removed by the sieve was negligible (less than 0.5%). For each storage test approximately 100 grams were placed in a sample jar. The sample jars were then placed in water baths set at 35° C. and 40° C. Samples based on all three particle sizes (coarse, medium and fine) were tested. They were checked visually for one week at 24-hour cycles. After the first week, they were checked on a weekly basis for up to 30 days.

None of the flash fusion samples exposed to the 35° C. water bath showed appreciable agglomeration over the 30 day time period. Samples were re-sieved through a 100-mesh sieve to collect any hardened agglomerate. No measurable agglomeration occurred in any of the samples.

Some clumping was apparent in the flash fusion samples from the 40° C. water bath. The clumping was easily broken via mechanical means. The 30-day samples were sieved through a 100-mesh screen on a laboratory-scale Vorti-Siv. No measurable agglomeration was present for any of the samples from the 40° C. water bath.

The host particle size had no effect on the powder storage stability. Samples based on coarse, medium and fine host particles all passed the testing.

The comparison sample that blended the crystalline material with the host ingredients in an extrusion process (7634-15J) was very difficult to extrude and grind even at a laboratory-scale. The collected chip had to be cooled overnight prior to grinding. The samples failed the storage stability test (both 35° C. and 40° C.) in less than 24 hours. Samples were sintered and had formed hard agglomerates that could not be broken up with the sieving process used in the previous examples.

Glass Transition Temperature of the Host Material and Effect on Storage Stability: The host material (core particles) Tg for the B sample was measured at between 41 and 42° C. The core Tg for the E sample was measured at between 31 and 33° C. The reduced Tg of the E core is due to the plasticizing effect of the crystalline resin (Uracross 3307) once it is solubilized in the amorphous resin (Uracross 3125). Powders formed through the flash fusion process were storage stable at temperatures at or above the Tg of the core (or host) material. For the E host formulations, the powder was storage stable at 7 to 9° C. above the Tg of the host particles.

Post-blending and sieving: A sample of fine grind 7634-15B was prepared using the general procedure. The particle size was measured at a $d_{10}$ of 7.47 μm, $d_{50}$ of 20.0 μm and a $d_{90}$ of 49.2 μm. Guest particles of crystalline resin (Uracross 3307) were micronized to a mean particle size of 2.4 microns. The crystalline guest particles were added using the general pre-mix and flash fusion procedures. Retains were taken at 0, 1 and 2 passes through the flash fusion equipment.

The fused particles were then mixed with 0.2 parts per hundred of fumed silica and 0.75 parts per hundred of a powder coalescing agent (Resiflow P-67) to improve powder flow and coalescence. The mixing was done in a lab-scale high intensity mixer at moderate mixing speeds. Finally, the samples were sieved through a 170-mesh screen. Collection of oversized agglomerates and contamination was negligible. These samples were then applied to MDF to demonstrate general appearance and cured film properties.

Appearance on MDF: The resulting powder was applied to medium density fiberboard (preheated 6"×6"×¾" panels) using standard electrostatic powder coating application procedures using a corona charging gun. The panels were preheated for 1 minute at 350° F. in a convection oven. The powder was applied and the samples hung vertically in the convection oven for two minutes at 350° F. The samples were then exposed to medium length IR radiation for an additional minute to complete the melting and leveling of the powder. Finally the samples were cured through exposure to ultraviolet radiation. Coating thickness was measured at 4 to 5 mils for all tested samples.

All cured samples were smooth with a minimum amount of orange peel. No cratering or surface defects were present. Panels passed MEK (50 double rubs) with no transfer and a very faint lowering of gloss. PCI Smoothness was rated at 6. Pencil Hardness (scratch) was 2H. Cross Hatch Adhesion was rated 4 (very slight flaking at some corners). Gloss readings are given in the following table.

TABLE 2.3

Cured film gloss readings as a function of number of passes through the flash fusion process

| 7634-15B/12.5 phr Uracross 3307 | 60° Gloss |
|---|---|
| 0 Pass | 66.9 ± 2.8 |
| 1 Pass | 73.1 ± 0.3 |
| 2 Pass | 70.5 ± 1.0 |

EXAMPLE 3

Evidence of Controlled Diffusion/Mixing in the Flash Fusion Stage

Purpose: Incorporation of incompatible additives and resins into powder coatings create significant challenges, especially in controlling the degree of mixing and reproducibility from lot to lot. This study demonstrates that the flash fusion process can be used to control the degree of mixing of a crystalline resin by varying process conditions, which in this study was accomplished by passing the host and guest particles through the heating zone multiple times.

Sample Preparation: The 7634-15B host and micronized Uracross 3307 guest particles were prepared using the methods and formulations described in Example 2. Host particles had a $d_{10}$ of 8.2 μm, a $d_{50}$ of 23.6 μm and a $d_{50}$ of 46.7 μm.

Mixing Operation: To the host powder, micronized Uracross 3307 guest particles were added at the 12.5 grams/100 grams host. The mixture was V-blended for 30 minutes and then passed through a lab sized MAIC mixer (refer to U.S. Pat. No. 5,962,082 for information on the MAIC mixing process).

Flash Fusion Operation: The mixed powder was then subjected to flash fusion according to the general procedure. The sample was passed through the flash fusion process 5 times with retains taken at 0, 1, 3 and 5 passes.

Controlled Mixing Demonstrated through DSC Data: As the residence time in the fusion process is increased (through multiple passes) the degree of mixing also increased. This is apparent by the suppression of the host Tg (data in Table 3.1). This is further confirmed by the reduction in the endotherm related to the crystalline melt point of the guest particles (Uracross 3307) located at between 90 to 100° C. As the number of passes increases this peak is reduced. Once again this indicates that the crystalline material is continuing to mix with the host particles every time it is passed through the flash fusion process. The process can be used to control formulation properties by controlling the degree of mixing. It is also a clear indication that the crystalline guest particles have lost at least some of their physical identities as individual, discrete particles.

TABLE 3.1

The Effect of Multiple Passes on the Glass Transition Temp. (Tg) of 7634-15B samples.

| B | Tg (° C.) |
|---|---|
| 0 Pass | 41.9 |
| 1 Pass | 39.7 |
| 3 Pass | 36.8 |
| 5 Pass | 35.2 |

EXAMPLE 4

A High Melt Viscosity Guest Particle on a Lower Melt Viscosity Host Particle Purpose: Additives and resins are frequently used to modify appearance and physical properties of powder coatings. Many of these raw materials are incompatible or significantly different from the resins in the formulation and can create difficult process challenges, especially in controlling the quality and uniformity of the powder coating composition. In this example, a higher melt viscosity resin is the guest particle used to modify the appearance and performance of a lower melting host particle.

Host Preparation: The host formula used in this experiment is presented in the following table. All of the ingredients were premixed in a lab-scale high intensity mixer. The material was then extruded on a 30-mm twin screw extruder, chipped manually and subsequently ground to a broad particle size distribution on a lab-scale grinder. The sample was then processed through a sieve separator equipped with a 270-mesh screen (nominal removal of all particles above 53 μm) to create a fine grind distribution. The host particle size distribution was $d_{10}$=6.72 μm, $d_{50}$=31.8 μm and $d_{90}$=67.7 μm.

TABLE 4.1

Host formula

| Raw Materials | Parts by weight |
|---|---|
| EPO-THOTO KD-6812 (bisphenol A epoxy from GCA Chemical Corp.) | 44.78 |
| GMA-301 (glycidyl methacrylate functional acrylic polymer from Estron Chemical) | 27.79 |
| Resiflow P67 (coalescing agent from Estron Chemical) | 1.09 |
| Uraflow B (melt flow modifier from GAC Chemical Corp.) | 0.36 |
| Dyhard PI (amine catalyst from Degussa Corp.) | 1.45 |
| Ultranox 626 (antioxidant from Ashland Chemical Co.) | 1.45 |
| Cyasorb UV-1164 (UV stabilizer from Cytec Industries Inc.) | 0.73 |
| Kronos 2310 (titanium dioxide from Kronos Titan GMBH & Co.) | 21.77 |
| Black Iron Oxide BK-4799 (pigment) | 0.07 |
| Honey Yellow #29 (pigment) | 0.29 |
| Kroma Red Iron Oxide RO-3097 (pigment) | 0.02 |

Guest Preparation: The raw material Joncryl SCX-845 from Johnson Polymer Inc. was ground. Two samples were obtained having volume average particle sizes of 6 μm and 15 μm (as determined by a Horiba laser light scattering particle sizing instrument), respectively. Approximately 0.2% by weight of aluminum oxide was added during the grinding process to prevent clumping of the ground material.

Mixing Operation: To the host powder, was added 5% by weight of either the 6 μm or 15 μm guest powder. The mixture was V-blended for 30 minutes and then passed through a lab sized MAIC mixer (see, e.g., U.S. Pat. No. 5,962,082 for information on the MAIC mixing process).

Labeling scheme of samples: Samples were given the ID labels in the following table. The explanation for the labeling scheme used in the table and for extruded reference material is as follows: The first number (6 or 15) indicates the size in μm of the guest particles (6 μm or 15 μm). The second number (0, 1, or 2) indicates the number of passes through the flash fusion equipment at 800° F. The Comparison sample involved co-processing using an extruder to make conventional homogeneous particles. See "General Powder Coating Extrusion and Grinding Process" section described above.

| Labeling Scheme |
|---|
| 6-0 |
| 6-1 |
| 6-2 |
| 15-0 |
| 15-1 |
| 15-2 |
| Comparison |

Flash Fusion: The mixed powder was then subjected to flash fusion according to the general procedure.

Post-blending and sieving: Prior to application testing all samples were modified through the addition of 0.2% of aluminum oxide. The post-add was mixed into the bulk of the sample in a laboratory-scale high-intensity mixer. The resulting powder was sieved through an 80-mesh screen to remove any contamination. Contamination levels were negligible for all samples (less than 0.5% removed).

Application: The powder was applied to medium density fiberboard samples (preheated 6"×6"×¾" panels) using standard electrostatic powder coating application procedures using a corona charging gun. The panels were hung vertically in an electric oven at 350° F. and baked for 10 min.

Evaluate: The uncured powder was tested for certain handling, powder morphology, and curing properties. The cured film performance was evaluated after application on MDF. The resulting panels were smooth with a mid-range gloss (60° Gloss between 36 and 51).

TABLE 4.2

MDF cured panel gloss measurements.

| Sample ID | 60° Gloss |
|---|---|
| Comparison (Extruded - Reference) | 44.4 ± 1.1 |
| 6-0 (V Blend - Mixed) | 50.9 ± 1.2 |
| 6-1 (1 pass of Flash Fusion) | 47.0 ± 1.1 |
| 6-2 (2 pass of Flash Fusion) | 45.5 ± 2.3 |
| 15-0 (V-Blend - Mixed) | 36.3 ± 1.2 |
| 15-1 (1 pass of Flash Fusion) | 36.6 ± 0.7 |
| 15-2 (2 pass of Flash Fusion) | 36.8 ± 3.5 |

Samples with 15-μm guest particles have lower gloss values. The larger sized guest particles do not diffuse into the base resin as readily. The smaller size guest particles are more susceptible to diffusion and mixing with the host core material. Thus it can be seen that controlling the size of the gloss-lowering agent is critical to achieving a consistent gloss. Since it is more difficult to get precise control over the size of these domains in a traditional extrusion process, it offers less control over gloss. Thus, the flash fusion method of constructing a powder coating can be used to get a more consistent control of gloss. Other properties that depend on controlled incompatibility and domain size should also be more consistent if the current method of powder coating processing is used.

Compressibility of the samples was measured. Samples which were mixed only ("–0" ending sample names) have high measured % compressibilities. This is attributed to the high number of small particles ("fines") in the particle size distribution of the samples. Once the samples are exposed to flash fusion, the % compressibility value decreases to levels lower than the samples prepared by the conventional method of producing powder coatings. This lowering of the compressibility should lead to improved storage and handling stability for the powder coating. For example it would be expected that the powder would have less of a tendency to form agglomerates and to sinter in the package. Likewise it would be expected to have less of a tendency to fuse under impact, a common problem in powder delivery systems.

TABLE 4.3

Compressibility

| Sample ID | % Compressibility |
|---|---|
| Comparison (Extruded - Reference) | 31.3 |
| 6-0 (V Blend - Mixed) | 44.8 |
| 6-1 (1 pass of Flash Fusion) | 31.9 |
| 6-2 (2 pass of Flash Fusion) | 26.1 |
| 15-0 (V-Blend - Mixed) | 37.8 |
| 15-1 (1 pass of Flash Fusion) | 27.7 |
| 15-2 (2 pass of Flash Fusion) | 21.7 |

Particle size distributions of the samples were also evaluated. The $d_{90}$ values of the volume average particle size distribution decreased slightly with the increasing number of flash fusion steps. The absence of any significant increase in the $d_{90}$ values with flash fusion is indirect evidence that there is little or no contact between particles during flash fusion to allow agglomeration. The decrease is possibly attributed to rounding of the edges of the large host particles during flash fusion. Such rounding is believed to create a more regular shape which creates an effectively smaller diameter when measured by the technique of laser light diffraction particle size analysis. The samples had a measured systematic increase in the $d_{10}$ values with increasing number of passes through the flash fusion process. The $d_{10}$ value is highly influenced by the population of fines in the sample. Increase $d_{10}$ values is indirect evidence of the guest particles being melted and fused onto the surface of the host particle.

The samples were visually studied via SEM analysis. After flash fusion, it was observed that the fines were partially fused onto the surface of the host particles. Some rounding of the host particle was observed. The fines still evident on the host particles surface are believed to be guest particles. These guest particles have a measured melt viscosity at 275° F., which is two orders of magnitude higher than that of the resin base of the host particles. This explains why they still remain visible in this particular example even though they are smaller in size and normally would have melted first. They are too viscous to flow out smoothly onto the surface of the host particles. The degree of coalescence between the guest particles and the host particles increased as the number of passes through the flash fusion process increased.

EXAMPLE 5

Process for Producing Highly Catalyzed Powder Coatings

Purpose: The reactivity of traditional powder coatings is often limited by the temperature at which the powders are manufactured. Very reactive compositions or compositions with high levels of catalysts are prone to chemical advancement during the extrusion process. Many of these compositions also exhibit poor chemical stability as they continue to chemically react over time. This study shows that high levels of catalyst in the form of guest particles can be attached to host particles to produce highly reactive powder coatings with good stability.

Host Preparation: The host formula used in this experiment is presented in the following table. The composition was moderately mixed in a high-intensity mixer. The material was extruded and ground according to the process described in the "General Powder Coating Extrusion and Grinding Process" section. The particle size distribution for the host was as follows: $d_{10}$=9.1 μm, $d_{50}$=21.7 μm, and $d_{90}$=39.1 μm.

TABLE 5.1

Host Formula 7634-19A

| Raw Materials | Parts by weight |
| --- | --- |
| Crylcoat 490 (carboxylic acid functional polyester from UCB Chemicals Corp.) | 67.51 |
| Araldite PT-810 (triglycidyl isocyanurate resin from Ciba Geigy Corp.) | 7.50 |
| A-C 540 Pellets (copolymer resin of ethylene and propenoic acid monomers from Allied Signal Corp.) | 0.98 |
| Resiflow P67 (coalescing agent from Estron Chemical) | 1.13 |
| Powdertex 61 (mixture of polytetrafluoroethylene and talc from Shamrock Technologies Inc.) | 0.19 |
| Tiona RCL-2 (titanium dioxide from Millennium Inorganic Chemicals) | 22.50 |

Guest Preparation: An epoxy curing catalyst, NP-6136 from H. B. Fuller Co., was ground. Approximately 0.1-0.2% by weight of aluminum oxide was added during the grinding process to prevent clumping of the ground material. The particle size of the micronized NP-6136 Guest particles could not be determined by laser light particle size analysis. The Guest particles are water soluble, and the particle size analysis method used is a water based Horiba laser light diffraction method. It was observed that by visual observation on a high-resolution optical microscope (not SEM), that most of the particles were smaller than 10 μm.

Mixing Operation: To the host powder, were added 2, 3, or 4 parts per hundred (1.5%, 2.2%, or 3.0%) by weight of the guest powder particles. The mixture was V-blended for 30 minutes and then passed through a lab sized MAIC mixer (see, e.g., U.S. Pat. No. 5,962,082 for information on the MAIC mixing process).

Labeling scheme of samples: Samples were given the ID labels in the following table. The explanation for the labeling scheme used in the table and for extruded reference material is as follows: The suffix of A1, A2, or A3 was added to reflect the different levels of catalyst guest particles (2 parts catalyst per hundred resin, 3 parts catalyst per hundred resin, and 4 parts catalyst per hundred resin, respectively). For example, the sample of host/guest that had 2 parts per hundred catalyst added is labeled as A1.

Flash Fusion: The mixed powder was then subjected to flash fusion according to the general procedure.

Application: The powder was applied to medium density fiberboard samples (preheated 6"×6"×¾" panels) using standard electrostatic powder coating application procedures using a corona charging gun. The panels were hung vertically in an electric oven at 350° F. and baked for 10 min.

Evaluate: The uncured powder was tested for certain handling, powder construction, and curing properties. The cured film performance was evaluated after application on MDF. The coating was a finely divided texture free of defects (cratering, agglomerates, etc.). 60° gloss readings were between 19.8 (2 Pass) for the A1 sample, 12.2 (2 Pass) for the A2 sample, and 27.8 (2 Pass) for the A3 sample. Pencil Hardness was 2H for all samples. All samples passed 50 MEK Double Rubs.

TABLE 5.2

Differential scanning calorimeter (DSC) curing peak exotherm minima and Tg (Glass Transition Temperatures)

| Number of Passes through the Flash Fusion Step | A1 (2 parts catalyst per hundred resin) | A2 (3 parts catalyst per hundred resin) | A3 (4 parts catalyst per hundred resin) |
| --- | --- | --- | --- |
| Peak Exotherm Temperatures (° C.) | | | |
| 0 Pass | 159.4 | 150.4 | 148.4 |
| 2 Pass | 160.7 | 158.1 | 153.7 |
| Glass Transition Temperatures (° C.) | | | |
| 0 Pass | 51.6 | 53.3 | 52.4 |
| 2 Pass | 52.2 | 53.8 | 52.7 |

There is a systematic decrease in the peak exotherm temperatures with increasing amounts of guest catalyst material. This demonstrates that increasing amounts of catalyst accelerate the reaction and allow curing to occur at lower temperatures.

Advantageously, there is negligible change in the uncured Tg values of the powder coating with repeated passes through the flash fusion process. Based on the negligible change in the Tg values with repeated passes through the flash fusion step, it is concluded that there is negligible or no chemical advancement that occurs in the samples, even when exposed to the high temperatures in the flash fusion process. Had there been increases in the Tg values, this could have indicated that chemical advancement was occurring in the flash fusion step.

The DSC heating curves show the melting transition of the guest particles (NP-6136) occurred at about 110° C. The peak on the curves for the 0 pass samples systematically increases in height with the increasing amount of guest particle added to the mix (2 parts per hundred, 3 parts per hundred, 4 parts per hundred). This demonstrates that they are independent domains and are not melted and diffused into the host particle. After flash fusion (2 pass curves), the guest peak is suppressed in both intensity and shifted to slightly lower temperatures. This demonstrates that the flash fusion step melts the guest particles onto the surface of the host particles. The loss of this peak is a strong indication of controlled mixing (by diffusion) and the loss of separate identity for the guest particle.

EXAMPLE 6

Effect of Flash Fusion Temperatures on Highly Catalyzed Powder Coatings

Purpose: In example 5 above, the flash fusion process was used to prepare highly catalyzed powder coating compositions. This example studies the effects of the flash fusion temperature on the morphology and stability of one of these very reactive powder coatings.

Host Preparation: This is the same as in Example 5.

Guest Preparation: This is the same as in Example 5.

Mixing Operation: All of the samples in this example were mixed at the 2-phr catalyst level (Sample A1 in Example 5).

Flash Fusion: The mixed powder was then subjected to flash fusion according to the general procedure at the hot air temperatures of 700° F., 800° F. and 900° F.

Application: The powder was applied to medium density fiberboard samples (preheated 6"×6"×¾" panels) using standard electrostatic powder coating application procedures using a corona charging gun. The panels were hung on vertically in an electric oven at 350° F. and baked for 10 min.

Evaluate: The uncured powder was tested for certain handling, powder construction, and curing properties. The cured film performance was evaluated after application on MDF.

TABLE 6.1

Differential scanning calorimeter (DSC) curing peak exotherm minima and Tg (Glass Transition Temperatures)

| Passes | (700° F.) | (800° F.) | (900° F.) |
|---|---|---|---|
| | Peak Exotherm Temperatures (° C.) | | |
| 0 Pass | 159.1 | 160.4 | 159.7 |
| 2 Pass | 159.4 | 164.4 | 166.7 |
| | Glass Transition Temperatures (° C.) | | |
| 0 Pass | 51.6 | 51.3 | 51.8 |
| 2 Pass | 52.3 | 49.9 | 52.5 |

For all of the samples tested, there is negligible change in the Tg values of all samples. This information provides reasonable evidence of little if any chemical advancement occurring. This also tends to confirm the results from Example 1.

The peak exotherm temperatures are interpreted to indicate that the guest particle (catalyst) is being increasingly volatilized to some degree by the increasing flash fusion temperatures. The peak exotherm temperature results for the 700° F. sample show negligible change between 0 pass and 2 pass. This appears to indicate that there is little if any loss in guest particle (catalyst) at this temperature, and this temperature (or an even lower temperature) is most ideally suited for this particular guest particle.

The samples were evaluated visually via SEM analysis. With the ordered mixture before the flash fusion step, the fines were observed on the surfaces of the Host particles. The fines included the added guest particles in addition to host dust particles, which were created in the manufacture of the host particles. After two heat fusion passes, the guest particles of 700° F. have coalesced onto the surfaces of the host particles. There is also partial rounding of the host particle's edges.

EXAMPLE 7

Manufacture of Powder Blends with Improved Resistance to Segregation

Purpose: Over the years, various commercial powder coatings have been produced that represent blends of two or more materials. Examples of these types of compositions include low gloss powder coatings, "granite" powder coatings, and special effect compositions like hammertones, veins, wrinkles and metallic powder coatings. These blends are prone to variations in gloss, color, and appearance due to segregation of the various blend components during processing and application. In this study, guest particles representing an organic powder coating are attached to aluminum flakes host particles to minimize particle segregation.

Host Preparation: The host formula used in this experiment is presented in the following table. The material was extruded and ground according to the process described in the "General Powder Coating Extrusion and Grinding Process" section.

TABLE 7.1

Host Formula for 3333-77A Silver Metallic Powder

| Raw Materials | Parts by weight |
|---|---|
| Crylcoat 440 (carboxylic acid functional polyester from UCB Chemicals Corp.) | 92.17 |
| Araldite PT-810 (triglycidyl isocyanurate resin from Ciba Geigy Corp.) | 5.11 |
| Modaflow 2000 (copolymer resin of ethyl acrylate and 2-ethylhexyl acrylate monomers from Solutia) | 1.46 |
| Uraflow B (melt flow modifier from GAC Chemical Corp.) | 0.34 |
| Accelerator DT 3162-2 (curing catalyst from Vantico Inc.) | 0.24 |
| Ultranox 626 (antioxidant from Ashland Chemical Co.) | 0.19 |
| Irganox 1010 (antioxidant from Ciba-Geigy) | 0.49 |

Guest Preparation: The guest particles were a mixture of commercially available aluminum flakes. Both pigments are shear sensitive. The guest particles were added to 10 lb. batches of the host particles to create individual samples. The addition levels are listed in the following table.

TABLE 7.2

Guest Particle Mixture

| Raw Materials | Amount added per 100 parts of Host Material |
|---|---|
| PCF 200AG (aluminum flake from Toyal) | 4.39 |
| PCR-214F (aluminum flake from Eckart America) | 3.08 |

Mixing Operation: The guest particles were added to the host material as indicated in Table 7.2. The mixture was mixed on a high-intensity lab mixer (Mixaco) 5 minutes at dispersion blade speed of 1,325 RPMs with full cooling. A reference sample was prepared. The reference sample was only bag blended by hand shaking a plastic bag of the mixture ("Dry Blend").

Flash Fusion: The mixed powder was then subjected to flash fusion according to the general procedure. A sample was obtained after the process was complete.

Application: The powder was applied to aluminum Q-panels at variable gun settings according to the following procedure in order to evaluate electrical characteristic effects on the powder application.

The spray equipment used was the Nordson Versa Spray manual gun in a fixed position with a vibratory feeder on a timer. Settings and times: spray time was 7 sec (timer setting 6); at an average flow rate ranging from about 1 to about 1.5 grams per second for the Dry Blend sample and ranging from about 1 to about 1.5 grams per second for the Flash Fusion sample; powder feed air 20 psig; gun to panel distance of 10"; vertically hung grounded 3"×5" aluminum Q-panels were the target substrate used. Individual panels were sprayed at 30, 40, 60, and 80 KV's with each of the 3 samples. All panels were sprayed at the above settings with film thickness allowed to vary according to the characteristics of each powder. The panels were hung on vertically in an electric oven at 375° F. and baked for 10 min.

Evaluate: The film properties were evaluated for dry spray, hiding and film thickness that resulted. The film thickness was measured using an Elcometer 256 FN-S9 coating thickness gauge (Elcometer, Inc.).

Dry spray was visually evaluated by appearance and by touch. The evaluation is a measure of the visual and physical roughness of a cured metallic coating. The roughness results from excess of pigment at the surface (and a subsequent deficiency of organic binder).

The samples processed through the flash fusion process gave improved transfer to the Q-panels, provided better hiding and had less dry spray at low KV settings. This is a strong indication that the powder does not segregate on application. When comparing areas of the test panels with comparable film thicknesses, the 1-pass sample showed better hiding and more metal flakes deposited as compared to the dry-blend sample.

TABLE 7.4

Results of application of 3333-77A Silver Metallic Powder

| Sample ID | Application Voltage (KV) | Avg. Film Thickness (mils) | Visual Appearance |
|---|---|---|---|
| Dry Blend | 30 | 1.1 | Dry Spray |
| 1 Pass | 30 | 1.5 | Dry Spray |
| Dry Blend | 40 | 0.9 | Slight Dry Spray, poor hiding |
| 1 Pass | 40 | 3.3 | Thicker than control, good hiding |
| Dry Blend | 60 | 1.9 | Poor hiding |
| 1 Pass | 60 | 3.8 | Thicker than control, good hiding |
| Dry Blend | 80 | 1.5 | Poor hiding |
| 1 Pass | 80 | 4.0 | Thicker than control, good hiding |

All publications, patents and patent documents are incorporated by reference herein, as though individually incorporated by reference. The invention has been described with reference to specific and preferred embodiments and techniques. However, other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

The invention claimed is:

1. A process for preparing composite particles for a powder coating composition, comprising the steps of:
   a. providing a first particle component comprising a plurality of first particles, wherein the first plurality of particles comprises a thermosetting, film-forming resin having a glass transition temperature (Tg);
   b. providing a second particle component comprising a plurality of second particles;
   c. mixing the first and second particle components to form a particle mixture;
   d. fluidizing said particle mixture; and
   e. transporting a flow of the fluidized particle mixture through a heating zone such that the fluidized particle mixture enters the heating zone to begin a heating event and exits the zone to end the heating event, said heating event occurring under conditions effective to fuse the first particles to the second particles to provide a plurality of composite particles, wherein the heating zone is at a temperature that is at least 100° F. greater than the Tg of said thermosetting, film-forming resin but the residence time of the thermosetting resin in the heating zone is sufficiently short such that the composite particles retain thermosetting characteristics and can be melted and cured when the composite particles are subsequently coated onto a substrate.

2. The process of claim 1, wherein the second plurality of particles comprises crystalline material.

3. The process of claim 2, wherein the composite particles have a chemical constitution such that, when applied as a powder coating composition, said particles are capable of flowing and curing to form a hard layer at a temperature at or below about 300° F. in a time less than about 10 minutes.

4. The process of claim 1, wherein the second plurality of particles comprises metal flakes.

5. The process of claim 4, wherein the metal flakes comprise aluminum flakes.

6. The process of claim 1, wherein the second plurality of particles comprises a mica.

7. The process of claim 1, wherein the second plurality of particles comprises a powder coating composition additive.

8. The method of claim 1, wherein the composite particles have an average particle size in the range of from about 3 μm to about 500 μm, wherein said composite particles have residual domains from a second particle coalesced therewith.

9. The method of claim 8, wherein the residual domains comprise from about 0.1 to about 30% of the total weight of the composite particles.

10. The method of claim 8, wherein the residual domains at least substantially encapsulate said composite particles.

11. The method of claim 1, wherein the composite particles are substantially spheroidized.

12. The method of claim 1, wherein the composite particles comprise a plurality of layers.

13. The method of claim 12, wherein the layers comprise first and second adjacent layers that are chemically distinct from each other.

14. The method of claim 1, wherein the residence time of the thermosetting resin in the heating zone is from 0.1 to 20 seconds.

15. The method of claim 1, wherein the residence time of the thermosetting resin in the heating zone is from 0.1 to 10 seconds.

16. The method of claim 1, wherein the heating zone is at a temperature in the range from 250° F. to 500° F.

17. The method of claim 1, wherein the heating zone is at a temperature in the range from 200° F. to 750° F.

18. The method of claim 1, wherein the heating zone occupies a portion of the total volume of a processing chamber through which the fluidized particle mixture is transported.

19. A process for preparing composite particles for a powder coating composition, comprising the steps of:
   a. providing a first particle component comprising a plurality of first particles, wherein the first plurality of particles comprises a film-forming resin having a glass transition temperature (Tg);
   b. providing a second particle component comprising a plurality of second particles, wherein the second plurality of particles comprises a crystalline material that has a melting point that is higher than the Tg of the film-forming resin;
   c. mixing the first and second particle components to form a particle mixture;
   d. fluidizing said particle mixture; and
   e. transporting a flow of the fluidized particle mixture through a heating zone such that the fluidized particle mixture enters the heating zone to begin a heating event and exits the zone to end the heating event, said heating event occurring under conditions effective to fuse the first particles and the second particles together to provide a plurality of composite particles, wherein the heating zone is at a temperature that is at least 100° F. greater than the Tg of said thermosetting, film-forming resin and the melting point of the crystalline material, and the residence time of the thermosetting resin in the heating zone is sufficiently short such that the composite particles retain thermosetting characteristics and can be melted and cured when the composite particles are subsequently coated onto a substrate.

20. The process of claim 19, wherein the composite particles can be formed into a cured coating at a temperature below 300° F.

21. The process of claim 19, wherein the composite particles can be formed into a cured coating at a temperature below 250° F.

22. The process of claim 19, wherein the composite particles can be formed into a cured coating at a temperature below 200° F.

23. The process of claim 19, wherein the heating event occurs at a temperature that is at least about 10° F. greater than the Tg of said film-forming resin.

24. The process of claim 19, wherein the heating event occurs at a temperature that is at least about 100° F. greater than the Tg of said film-forming resin.

25. The process of claim 19, wherein the crystalline material is present in an amount of 11.1 percent by weight of the total weight of the first and second particle components.

26. A process for preparing composite particles for a powder coating composition, comprising the steps of:
  a. providing a first particle component comprising a plurality of first particles, wherein the first plurality of particles comprises a thermosetting, film-forming resin having a glass transition temperature (Tg);
  b. providing a second particle component comprising a plurality of second particles, wherein one of said first and second particle components constitutes host particles and the other particle component constitutes guest particles, wherein the ratio of the median particle size (volume D50) of the host particles to the guest particles is greater than about 3:1;
  c. mixing the first and second particle components to form an ordered particle mixture;
  d. fluidizing said ordered particle mixture; and
  e. transporting a flow of the fluidized particle mixture through a heating zone such that the fluidized particle mixture enters the heating zone to begin a heating event and exits the zone to end the heating event, said heating event occurring under temperature conditions effective to fuse the first particles to the second particles to provide a plurality of composite particles, and wherein the residence time of the thermosetting resin in the heating zone during the heating event is sufficiently short such that the composite particles retain thermosetting characteristics and can be melted and cured when the composite particles are subsequently powder coated onto a substrate.

27. The process of claim 26, wherein the host particles have a median particle size in the range of 15 to 50 micrometers and the guest particles have a median particle size in the range of less than 10 micrometers and wherein the ratio of the median particle size of the host particles to the guest particles is greater than about 10:1.

* * * * *